United States Patent

(12) United States Patent
Sugihara et al.

(10) Patent No.: US 11,487,355 B2
(45) Date of Patent: Nov. 1, 2022

(54) INFORMATION PROCESSING APPARATUS AND INFORMATION PROCESSING METHOD

(71) Applicant: SONY CORPORATION, Tokyo (JP)

(72) Inventors: Kenji Sugihara, Tokyo (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/057,786

(22) PCT Filed: Mar. 4, 2019

(86) PCT No.: PCT/JP2019/008278
§ 371 (c)(1),
(2) Date: Nov. 23, 2020

(87) PCT Pub. No.: WO2019/230096
PCT Pub. Date: Dec. 15, 2019

(65) Prior Publication Data
US 2021/0232219 A1     Jul. 29, 2021

(30) Foreign Application Priority Data

May 31, 2018   (JP) .............................. JP2018-104196

(51) Int. Cl.
*G06F 3/01*       (2006.01)
*G02B 27/00*    (2006.01)
(Continued)

(52) U.S. Cl.
CPC .......... *G06F 3/013* (2013.01); *G02B 27/0093* (2013.01); *G02B 27/017* (2013.01); *G06F 3/012* (2013.01); *G06F 3/04815* (2013.01)

(58) Field of Classification Search
None
See application file for complete search history.

(56) References Cited

U.S. PATENT DOCUMENTS

2010/0201621 A1   8/2010   Niikawa
2011/0006978 A1   1/2011   Yuan
(Continued)

FOREIGN PATENT DOCUMENTS

CA          2925984 A1     8/2016
CN       101943982 A       1/2011
(Continued)

OTHER PUBLICATIONS

International Search Report and Written Opinion of PCT Application No. PCT/JP2019/008278, dated Apr. 16, 2019, 09 pages of ISRWO.

*Primary Examiner* — Ifedayo B Iluyomade
(74) *Attorney, Agent, or Firm* — Chip Law Group

(57) ABSTRACT

It is desired to provide a technology capable of controlling an object so as to improve user convenience. An information processing apparatus is provided. The information processing apparatus includes an object control unit that: suppresses a movement of a first object, on the basis of a first line-of-sight movement in which a gaze point of a user moves toward a first part of the first object or has moved to the first part; and moves the first object such that the first object leaves away from the gaze point of the user, on the basis of a second line-of-sight movement in which the gaze point of the user moves toward a second part of the first object different from the first part or has moved to the second part.

18 Claims, 20 Drawing Sheets

(51) Int. Cl.
  *G02B 27/01*   (2006.01)
  *G06F 3/04815* (2022.01)

(56) References Cited

U.S. PATENT DOCUMENTS

| | | | |
|---|---|---|---|
| 2013/0135196 A1* | 5/2013 | Park | G06F 3/0481 |
| | | | 348/78 |
| 2014/0247210 A1* | 9/2014 | Henderek | G06F 3/02 |
| | | | 345/156 |
| 2014/0285404 A1 | 9/2014 | Takano et al. | |
| 2015/0091943 A1 | 4/2015 | Lee et al. | |
| 2016/0299649 A1 | 10/2016 | Fujita | |
| 2016/0371886 A1* | 12/2016 | Thompson | G06F 3/013 |
| 2018/0366090 A1* | 12/2018 | Shatzki | G01C 23/005 |
| 2020/0033942 A1* | 1/2020 | Saito | G06F 3/017 |

FOREIGN PATENT DOCUMENTS

| | | | | |
|---|---|---|---|---|
| CN | 104076512 A | | 10/2014 | |
| EP | 2784632 A2 | | 10/2014 | |
| EP | 3079049 A2 | | 10/2016 | |
| IL | PCT/IL2018050337 | * | 3/2018 | |
| JP | 2000-194469 A | | 7/2000 | |
| JP | 2011-076434 A | | 4/2011 | |
| JP | 2012-530305 A | | 11/2012 | |
| JP | 2015-087921 A | | 5/2015 | |
| JP | 2016-200876 A | | 12/2016 | |
| JP | 2017073448 | * | 4/2017 | G06F 3/01 |
| KR | 10-2012-0027507 A | | 3/2012 | |
| KR | 10-2015-0037254 A | | 4/2015 | |
| WO | 2009/019760 A1 | | 2/2009 | |
| WO | 2011/003303 A1 | | 1/2011 | |
| WO | 2015/046686 A1 | | 4/2015 | |
| WO | 2016/163150 A1 | | 10/2016 | |
| WO | 2017/187708 A1 | | 11/2017 | |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/008278 filed on Mar. 4, 2019, which claims priority benefit of Japanese Patent Application No. JP 2018-104196 filed in the Japan Patent Office on May 31, 2018. Each of the above-referenced applications is hereby incorporated herein by reference in its entirety.

TECHNICAL FIELD

The present disclosure relates to an information processing apparatus, an information processing method, and a program.

BACKGROUND ART

In recent years, a technology for moving an object on the basis of the line of sight of a user is known. For example, a technology is disclosed in which a candidate for an operation target object is specified on the basis of the position of the line of sight of the user, and when there is a plurality of specified candidates, at least one of the plurality of candidates is moved such that the plurality of candidates is separated from each other (see, for example, Patent Document 1).

CITATION LIST

Patent Document

Patent Document 1: International Publication No. 2017/187708

SUMMARY OF THE INVENTION

Problems to be Solved by the Invention

However, it is desired to provide a technology capable of controlling the object so as to improve user convenience.

Solutions to Problems

The present disclosure provides an information processing apparatus including an object control unit that: suppresses a movement of a first object, on the basis of a first line-of-sight movement in which a gaze point of a user moves toward a first part of the first object or has moved to the first part; and moves the first object such that the first object leaves away from the gaze point of the user, on the basis of a second line-of-sight movement in which the gaze point of the user moves toward a second part of the first object different from the first part or has moved to the second part.

The present disclosure provides an information processing method including: suppressing, by a processor, a movement of a first object, on the basis of a first line-of-sight movement in which a gaze point of a user moves toward a first part of the first object or has moved to the first part; and moving, by the processor, the first object such that the first object leaves away from the gaze point of the user, on the basis of a second line-of-sight movement in which the gaze point of the user moves toward a second part of the first object different from the first part or has moved to the second part.

The present disclosure provides a program for causing a computer to function as an information processing apparatus including an object control unit that: suppresses a movement of a first object, on the basis of a first line-of-sight movement in which a gaze point of a user moves toward a first part of the first object or has moved to the first part; and moves the first object such that the first object leaves away from the gaze point of the user, on the basis of a second line-of-sight movement in which the gaze point of the user moves toward a second part of the first object different from the first part or has moved to the second part.

Effects of the Invention

As described above, according to the present disclosure, a technology capable of controlling an object so as to improve user convenience is provided. Note that the above-mentioned effect is not necessarily limited, and any effects indicated in the present description or other effects that can be learned from the present description may be exhibited together with the above-mentioned effect or instead of the above-mentioned effect.

MODE FOR CARRYING OUT THE INVENTION

Figure 1:
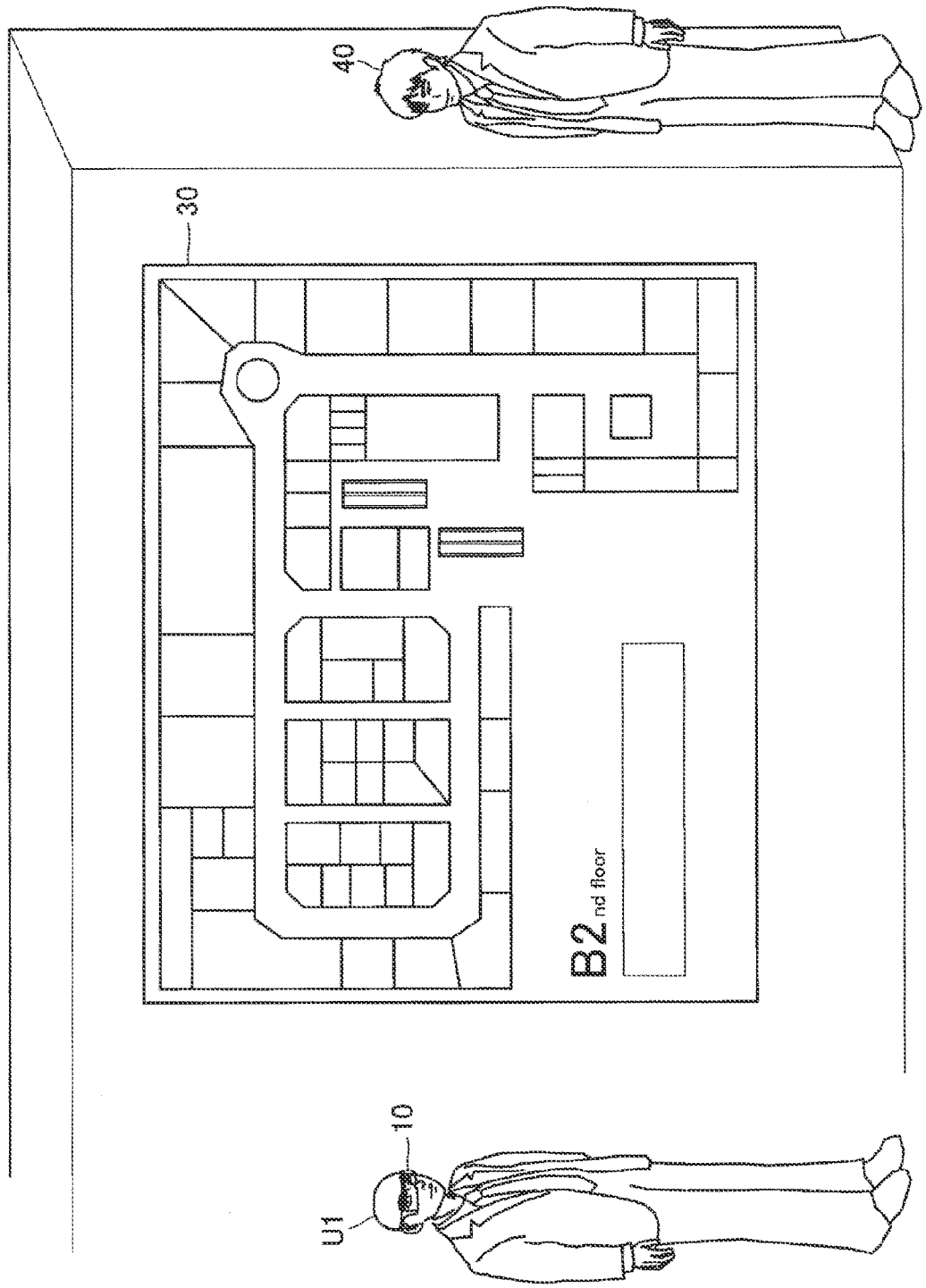
FIG. 1 is a diagram illustrating a configuration example of an information processing system according to embodiments of the present disclosure.

Hereinafter, favorable embodiments of the present disclosure will be described in detail with reference to the accompanying drawings. Note that, in the present description and the drawings, constituent elements having substantially the same functional configuration will be denoted by the same reference numeral and redundant description will be omitted.

Furthermore, in the present description and the drawings, a plurality of constituent elements having substantially the same or equivalent functional configuration is sometimes distinguished by attaching different numerals after the same reference numeral. However, when it is not necessary to particularly distinguish each of a plurality of constituent elements having substantially the same or equivalent functional configuration, only the same reference numeral is attached. In addition, equivalent constituent elements of different embodiments are sometimes distinguished by attaching different alphabets after the same reference numeral. However, when it is not necessary to particularly distinguish each of equivalent constituent elements, only the same reference numeral is attached.

Note that the description will be given in the following order.

0. Overview
1. Details of Embodiments
1.1. System Configuration Example
1.2. Functional Configuration Example of Information Processing Apparatus
1.3. Details of Functions of Information Processing System
1.3.1. Agent Control
1.3.2. Action of Information Processing Apparatus
1.3.3. Various Modifications
2. Hardware Configuration Example
3. Conclusion

0. OVERVIEW

First, the overview of embodiments of the present disclosure will be described. In recent years, a technology for moving an object on the basis of the line of sight of a user is known. For example, a technology is disclosed in which a candidate for an operation target object is specified on the basis of the position of the line of sight of the user, and when there is a plurality of specified candidates, at least one of the plurality of candidates is moved such that the plurality of candidates is separated from each other. However, it is desired to provide a technology capable of controlling the object so as to improve user convenience.

For example, it is assumed that the position of the object that is highly convenient for the user differs depending on the user's degree of interest in the object. Moreover, it is assumed that where the user's gaze point is likely to be located in the object is varied depending on the user's degree of interest in the object. Therefore, in the embodiments of the present disclosure, a technology of controlling the position of an object depending on where the user's gaze point is located in the object will be mainly described.

For example, it is assumed that, when the user's degree of interest in the object is stronger than a certain extent, the user's gaze point is likely to be present in a first part (for example, the face of the object), and when the user's interest in the object is weaker than a certain extent, the user's gaze point is likely to be present in a second part (for example, the body of the object) different from the first part of the object. Therefore, in the embodiments of the present disclosure, a technology of differentiating the positions of the object between a case where the user's gaze point is located in the first part of object and a case where the user's gaze point is located in the second part of the object will be mainly described.

Note that, in the following description, a case where the first part includes the face of the object will be given as an example, and a case where the second part includes the body of the object (a trunk portion below the neck portion) will be given as an example. However, the first part and the second part are not limited to such examples. For example, the first part may include the head (including the face) of the object. Moreover, the neck portion of the object may be included in the first part, or may be included in the second part, or may not be included in either part.

Furthermore, in the embodiments of the present disclosure, an object (first object) whose movement is controlled depending on the position of the gaze point of the user is sometimes referred to as an "agent". The agent can also contain meaning of an object that performs a process on behalf of the user. However, the agent according to the embodiments of the present disclosure is not necessarily an object that performs a process on behalf of the user, and the type of the process performed by the agent according to the embodiments of the present disclosure is not particularly limited.

Moreover, in the embodiments of the present disclosure, a case where the agent is an object (virtual object) displayed in the display area of a display unit 152 will be mainly described. However, the agent may be a real object capable of moving autonomously. At this time, the movement of the real object may be enabled in any way. For example, when the real object includes a rotating body (for example, a tire, a wheel, or a roller), the real object may be capable of moving on a surface (for example, on a floor surface) by rotationally driving the rotating body. Alternatively, when the real object includes a foot portion, the real object may be capable of moving on a surface (for example, on a floor surface) by driving the foot portion as if walking.

Heretofore, the overview of the embodiments of the present disclosure has been described.

1. DETAILS OF EMBODIMENTS

First, details of the embodiments of the present disclosure will be described.

[1.1. System Configuration Example]

First, a configuration example of an information processing system according to the embodiments of the present disclosure will be described with reference to the drawings. FIG. 1 is a diagram illustrating a configuration example of the information processing system according to the embodiments of the present disclosure. As illustrated in FIG. 1, the information processing system according to the embodiments of the present disclosure includes an information processing apparatus 10. The information processing apparatus 10 is utilized by a user U1.

Note that, in the present embodiments, a case where the information processing apparatus 10 is a head mounted display (HMD) worn on the head of the user U1 will be mainly described. Particularly, in the present embodiments, a case where the information processing apparatus 10 is a see-through type HMD will be mainly described. However, the information processing apparatus 10 is not limited to the HMD. For example, the information processing apparatus 10 may be a smartphone, a mobile phone, a tablet terminal, a camera, a personal computer (PC), or another type of equipment.

The user U1 can visually recognize the real space. In the example illustrated in FIG. 1, the user U1 can visually recognize the real space through the information processing apparatus 10. Any object may be present in the real space. In the example illustrated in FIG. 1, a person 40 is present in the real space as an example of a second object different from the above-mentioned agent. However, the person 40 is merely an example of the second object. Therefore, instead of the person 40, another object may be present in the real space as the second object. A third object will be described later.

Furthermore, in the example illustrated in FIG. 1, a map 30 is present in the real space as an example of a fourth object different from the above-mentioned agent. Then, in the example illustrated in FIG. 1, the map 30 is a floor map, and a plurality of stores present on a floor is drawn on the map 30. However, the map 30 is merely an example of the fourth object. Therefore, instead of the map 30, another object may be present in the real space as the fourth object.

Heretofore, a configuration example of the information processing system according to the embodiments of the present disclosure has been described.

[1.2. Functional Configuration Example of Information Processing Apparatus]

Figure 2:
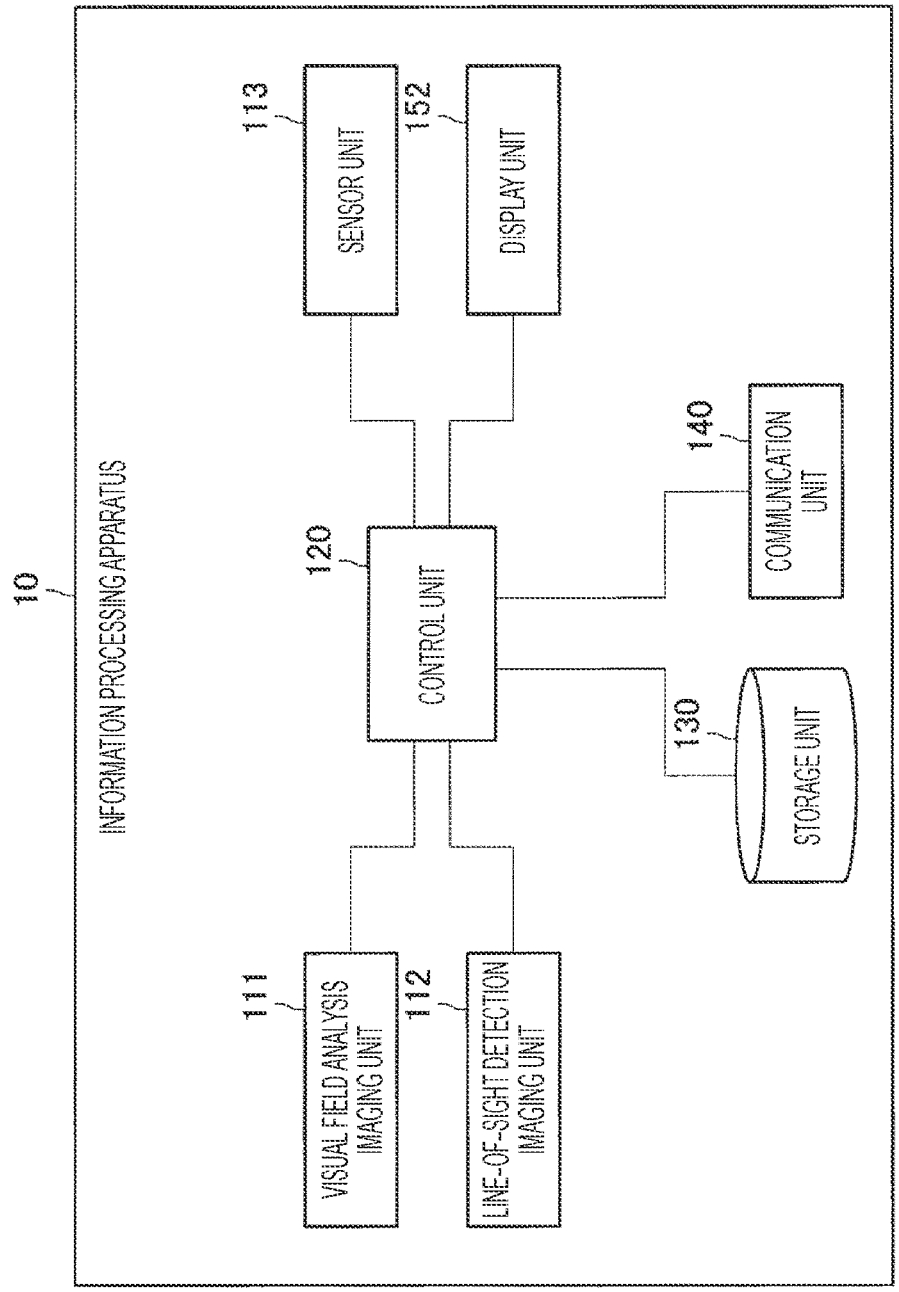
FIG. 2 is a diagram illustrating a functional configuration example of an information processing apparatus.

Subsequently, a functional configuration example of the information processing apparatus 10 will be described. FIG. 2 is a diagram illustrating a functional configuration example of the information processing apparatus 10. As illustrated in FIG. 2, the information processing apparatus 10 includes a visual field analysis imaging unit 111, a line-of-sight detection imaging unit 112, a sensor unit 113, a control unit 120, a storage unit 130, a communication unit 140, and a display unit 152. Furthermore, the information processing apparatus 10 may be connected to a server apparatus (not illustrated) via a communication network. The communication network includes, for example, the Internet.

The visual field analysis imaging unit 111 has a function of obtaining an image (visual field analysis image) by imaging the visual field of the user U1. For example, the visual field analysis imaging unit 111 includes a camera (including an image sensor), and obtains the visual field analysis image captured by the camera. The number of cameras included in the visual field analysis imaging unit 111 is not particularly limited as long as one or more cameras are included. Additionally, the position at which the visual field analysis imaging unit 111 is provided is also not particularly limited. Here, a case where the visual field analysis imaging unit 111 is present inside the information processing apparatus 10 is mainly assumed, but the visual field analysis imaging unit 111 may be present outside the information processing apparatus 10.

The line-of-sight detection imaging unit 112 has a function of obtaining an image (line-of-sight detection image) by imaging the eye of the user U1. For example, the line-of-sight detection imaging unit 112 includes a camera (including an image sensor), and obtains the line-of-sight detection image captured by the camera. The number of cameras included in the line-of-sight detection imaging unit 112 is not particularly limited as long as one or more cameras are included. Additionally, the position at which the line-of-sight detection imaging unit 112 is provided is also not particularly limited. Here, a case where the line-of-sight detection imaging unit 112 is present inside the information processing apparatus 10 is mainly assumed, but the line-of-sight detection imaging unit 112 may be present outside the information processing apparatus 10.

The sensor unit 113 includes a sensor in the configuration, and has a function of detecting the motion of the visual field of the user U1. For example, the sensor unit 113 can include an acceleration sensor in the configuration, and detect the motion of the visual field of the user U1 according to the acceleration detected by the acceleration sensor. Alternatively, the sensor unit 113 can include a gyro sensor in the configuration, and detect the motion of the visual field of the user U1 according to the angular velocity detected by the gyro sensor. Note that the motion of the visual field of the user U1 may be detected on the basis of the visual field analysis image captured by the visual field analysis imaging unit 111.

Furthermore, the sensor unit 113 has a function of detecting the position and posture of the head (sensor unit 113) of the user U1. For example, the sensor unit 113 can include a position sensor (for example, a global positioning system (GPS) sensor) in the configuration, and detect the position of the head of the user U1 by the position sensor.

In addition, the sensor unit 113 can include a geomagnetic sensor in the configuration, and detect the posture of the head of the user U1 by the geomagnetic sensor. Moreover, the sensor unit 113 may detect the posture of the user with higher accuracy on the basis of at least one of an acceleration sensor or a gyro sensor in addition to the geomagnetic sensor or instead of the geomagnetic sensor. Alternatively, when a camera is installed outside the information processing apparatus 10, the orientation of the face recognized from an image captured by the outside camera may be detected as the posture of the head of the user U1. Note that the position and posture of the head of the user U1 may be detected on the basis of the visual field analysis image captured by the visual field analysis imaging unit 111.

The communication unit 140 includes a communication circuit in the configuration, and has a function of acquiring data from a server apparatus (not illustrated) connected to the communication network and providing data to the server apparatus (not illustrated) via the communication network. For example, the communication unit 140 is configured from a communication interface. Note that one server apparatus (not illustrated) or a plurality of server apparatuses (not illustrated) may be connected to the communication network.

The storage unit 130 includes a memory in the configuration, and is a recording medium that stores a program executed by the control unit 120 and stores data necessary for the execution of the program. Furthermore, the storage unit 130 temporarily stores data for computation by the control unit 120. The storage unit 130 is configured from a magnetic storage unit device, a semiconductor storing device, an optical storing device, a magneto-optical storing device, or the like.

The display unit 152 has a function of displaying various screens. The type of the display unit 152 is not limited. For example, the display unit 152 only needs to be a display capable of providing a view that can be visually recognized by the user, and may be a liquid crystal display or an organic electro-luminescence (EL) display.

The control unit 120 executes control of each unit of the information processing apparatus 10. For example, the control unit 120 can be configured from one or a plurality of central processing units (CPUs) or the like. When the control unit 120 is configured from a processing unit such as a CPU, this processing unit can be configured from an electronic circuit. The control unit 120 can be implemented by such a processing unit executing a program.

Figure 3:
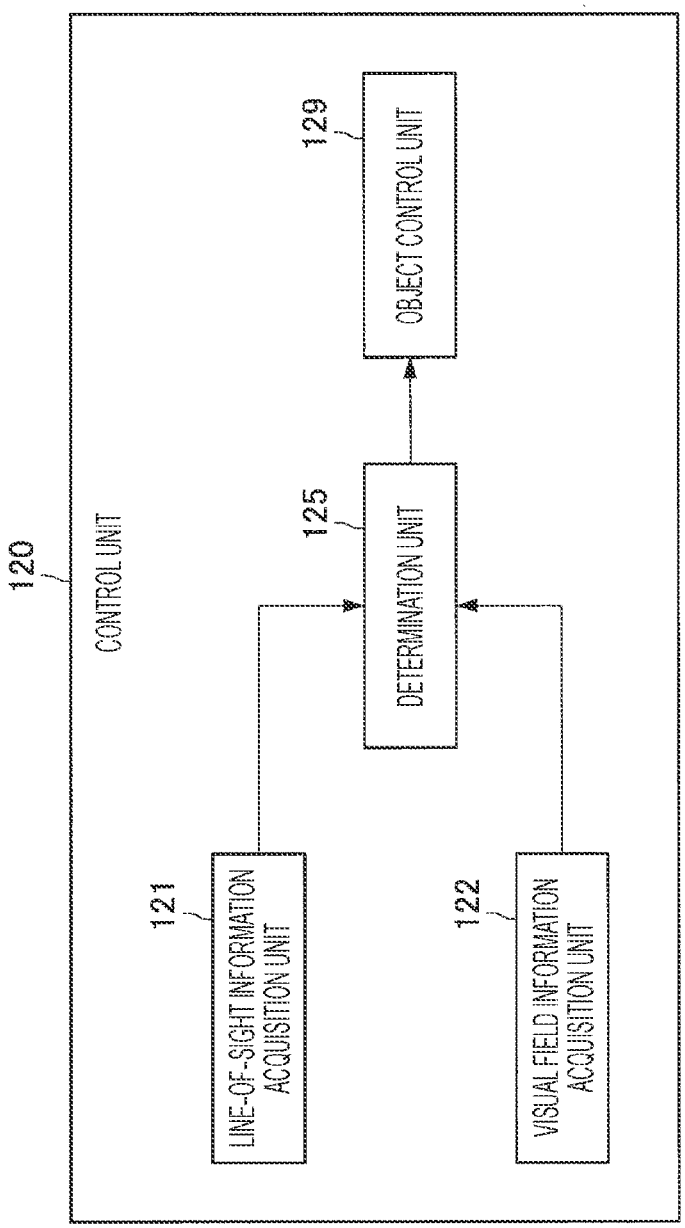
FIG. 3 is a diagram illustrating a detailed configuration example of a control unit.

FIG. 3 is a diagram illustrating a detailed configuration example of the control unit 120. As illustrated in FIG. 3, the control unit 120 includes a line-of-sight information acquisition unit 121, a visual field information acquisition unit 122, a determination unit 125, and an object control unit 129. Details of each of these functional blocks will be described later.

Heretofore, a functional configuration example of the information processing apparatus 10 according to the present embodiments has been described.

[1.3. Details of Functions of Information Processing System]

Subsequently, details of the functions of the information processing system according to the present embodiments will be described.

(1.3.1. Agent Control)

Examples of agent control will be described with reference to FIGS. 4 to 8. FIGS. 4 to 8 are diagrams for explaining examples of agent control. Referring to FIGS. 4 to 8, the user U1 is present in the real space. Note that, actually, the user U1 wears the information processing apparatus 10 on his/her head, but in the embodiments of the present disclosure, the illustration of the information processing apparatus 10 worn on the head of the user U1 is appropriately omitted.

Figure 4:
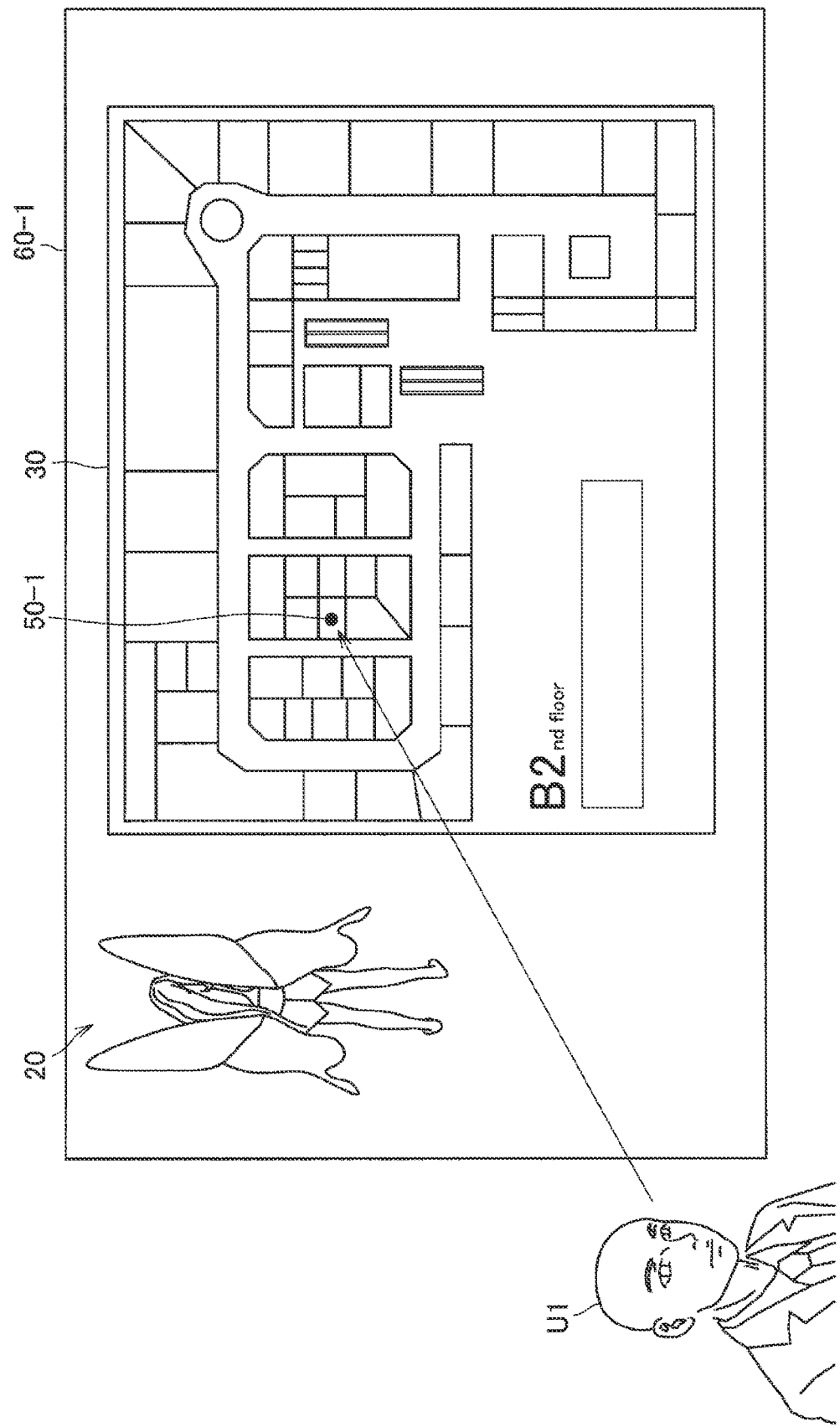
FIG. 4 is a diagram for explaining an example of agent control.

Referring to FIG. 4, a visual field 60-1 of the user U1 is illustrated. The map 30 is present in the visual field 60-1. The object control unit 129 designates (localizes) the position of an agent 20 in the real space on the basis of information in the real space (for example, the user's gaze point), and arranges the agent at the designated position. First, the object control unit 129 arranges the agent 20 at an initial position in the real space on the basis of the information in the real space. The initial position is not particularly limited. Here, a case where the initial position falls within a peripheral visual field of the user U1 and the object control unit 129 arranges the agent 20 in the peripheral visual field is assumed. This arrangement ensures that the visual recognition of objects (real objects or virtual objects) other than the agent 20 present in a central visual field is not obstructed. Note that the peripheral visual field may be regarded as an area outside the central visual field of the user U1.

In addition, when the user is tired, the user tends to turn the line of sight downward. Therefore, when the agent 20 is arranged on an upper side of the middle of the visual field, the hindrance of visual recognition of objects other than the agent 20 present on a lower part of the visual field can be suppressed.

Here, the central visual field can be an area including the center of the visual field 60-1. For example, the central visual field can be an area sandwiched by straight lines that are each a straight line passing through the position of the head of the user U1 and have an angle (A1/2) as an angle formed with the center of the visual field 60-1. The specific size of the angle A1 is not limited. In particular, when the agent 20 is a virtual object, the object control unit 129 can arrange the agent 20 in the central visual field by displaying the agent 20 in a middle area of the display area of the display unit 152.

Furthermore, the peripheral visual field can be an area obtained by excluding the central visual field from an area sandwiched by straight lines that are each a straight line passing through the position of the head of the user U1 and have an angle (A2/2) as an angle formed with the center of the visual field 60-1. The specific size of the angle A2 is not limited. In particular, when the agent 20 is a virtual object, the object control unit 129 can arrange the agent 20 in the peripheral visual field by displaying the agent 20 on the boundary (in a boundary area) of the display area of the display unit 152.

As described above, when the position and posture of the head of the user U1 are detected by the sensor unit 113, the visual field information acquisition unit 122 acquires position information and posture information on the head of this user U1. Besides, the visual field information acquisition unit 122 acquires the visual field analysis image captured by the visual field analysis imaging unit 111.

The line-of-sight information acquisition unit 121 acquires line-of-sight information on the user U1. The line-of-sight information acquisition unit 121 may acquire the line-of-sight information on the user U1 in any way. Here, a case where the line-of-sight information acquisition unit 121 detects the positional relationship between the center position of the pupil and the Purkinje image from the line-of-sight detection image, and calculates the line of sight on the basis of the detected positional relationship is mainly assumed. However, the line-of-sight information acquisition unit 121 may acquire the posture information on the head of the user U1 as the line-of-sight information.

The determination unit 125 detects a gaze point 50-1 of the user U1 in the real space on the basis of the position information and posture information on the head of the user U1 and the line-of-sight information on the user U1.

Then, the determination unit 125 determines whether or not the gaze point 50-1 is moving toward the agent 20 or has moved to the agent 20. For example, the determination unit 125 can determine that the gaze point 50-1 has moved toward the agent 20 when it is predicted that the gaze point 50-1 will reach the agent 20, on the basis of a change in the gaze point 50-1. Meanwhile, the determination unit 125 can determine that the gaze point 50-1 has moved to the agent 20 when the gaze point 50-1 is actually located on the agent 20.

In the example illustrated in FIG. 4, the gaze point 50-1 is present at a position different from the position of the agent 20. The determination unit 125 determines that the gaze point 50-1 has not moved toward the agent 20 and the gaze point 50-1 has not moved to the agent 20. In this manner, when the determination unit 125 determines that the gaze point 50-1 has not moved toward the agent 20 or has not moved to the agent 20, the object control unit 129 simply continues a state in which the agent 20 is arranged in the peripheral visual field (simply moves the agent 20 in the real space according to a change in the visual field 60-1 such that the agent 20 is continuously located in the peripheral visual field).

Figure 5:
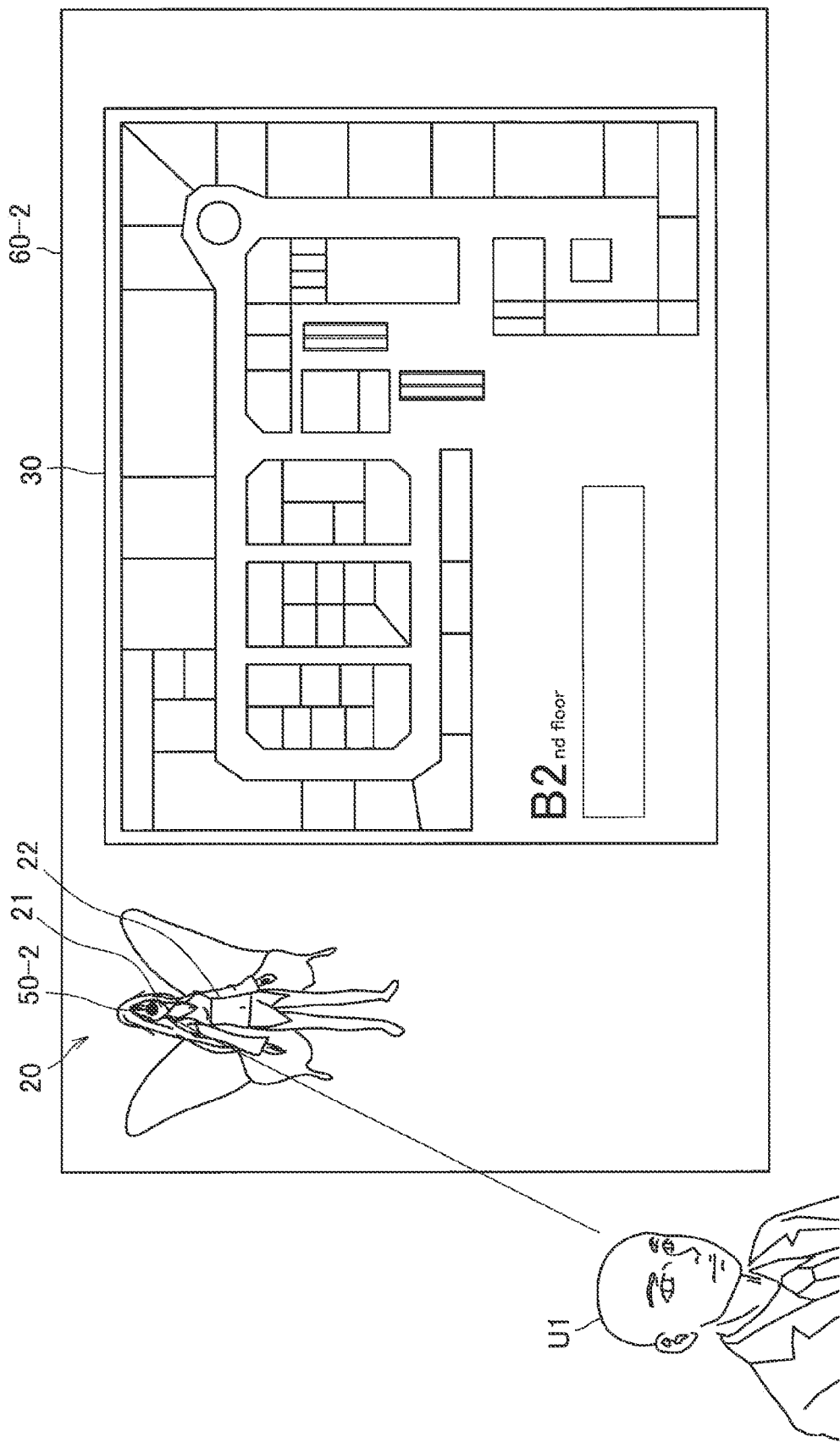
FIG. 5 is a diagram for explaining an example of agent control.

Referring to FIG. 5, the visual field of the user U1 has changed from the visual field 60-1 (FIG. 4) to a visual field 60-2. The determination unit 125 determines whether or not a line-of-sight movement (first line-of-sight movement) has occurred in which a gaze point 50-2 moves toward a face 21 of the agent 20 or has moved to the face 21 of the agent 20. For example, the determination unit 125 can determine that the gaze point 50-2 has moved toward the face 21 when it is predicted that the gaze point 50-2 will reach the face 21 on the basis of a change in the gaze point 50-2 (before the gaze point 50-2 reaches the face 21). Meanwhile, the determination unit 125 can determine that the gaze point 50-2 has moved to the face 21 when the gaze point 50-2 is actually located on the face 21.

In the example illustrated in FIG. 5, the gaze point 50-2 is located on the face 21. Therefore, the determination unit 125 determines that the line-of-sight movement (first line-of-sight movement) has occurred in which the gaze point 50-2 has moved to the face 21. In this manner, when the determination unit 125 determines that the line-of-sight movement (first movement) in which the gaze point 50-2 moves toward the face 21 or has moved to the face 21 has occurred, the object control unit 129 simply suppresses the movement of the agent 20 on the basis of such a line-of-sight movement (first line-of-sight movement). It is assumed that this makes it easier for the user U1 to visually recognize the agent 20.

Note that, as illustrated in FIGS. 4 and 5, the object control unit 129 may change the orientation of the face 21 on the basis of the line-of-sight movement (first line-of-sight movement) in which the gaze point 50-2 (gaze point 50-1) moves toward the face 21 or has moved to the face 21. For example, in FIG. 4, the object control unit 129 turns a front surface of the agent 20 toward a further side as viewed from the user U1. Compared to this, as illustrated in FIG. 5, the object control unit 129 can turn the face 21 toward the user U1 on the basis of the line-of-sight movement (first line-of-sight movement) in which the gaze point 50-2 moves toward the face 21 or has moved to the face 21. This makes it easier for the user U1 to intuitively understand that the gaze point 50-2 moves toward the face 21 or has moved to the face 21. Note that, in contrast to FIG. 5, in FIG. 4, a front surface of the agent 20 faces a further side as viewed from the user U1 (looks the other way). Therefore, the user U1 is more easily allowed to intuitively understand that the gaze point 50-1 has not moved toward the face 21 of the agent 20 or has not moved to the face 21.

In more detail, the object control unit 129 can turn a front surface of a body 22 toward the user U1 after turning the face 21 toward the user U1, on the basis of the line-of-sight movement (first line-of-sight movement) in which the gaze point 50-2 moves toward the face 21 or has moved to the face 21. This makes it easier for the user U1 to intuitively understand that the gaze point 50-2 moves toward the face 21 or has moved to the face 21, by the natural motion of the agent 20.

Note that the determination unit 125 does not have to determine whether or not the line-of-sight movement (first line-of-sight movement) in which the gaze point 50-2 has moved to the face 21 has occurred, when the face 21 is not present in the visual field 60-2. This is because, in a case where the face 21 is turned toward the user U1 from the time point when the face 21 is not present in the visual field 60-2, the face 21 is supposed to be already turned toward the user U1 when the face 21 enters the field of view 60-2, and it is considered that the user U1 feels uncomfortable.

Note that the embodiments of the present disclosure mainly assume a case where the object control unit 129 suppresses the movement of the agent 20 by making the position of the agent 20 in the real space unchanged. However, the movement of the agent 20 may be suppressed in any way. For example, the object control unit 129 may suppress the movement of the agent 20 by moving the agent 20 in the real space slower than the movement of the agent 20 when the gaze point 50-1 is located at a position different from the position of the agent 20 (FIG. 4).

Figure 6:
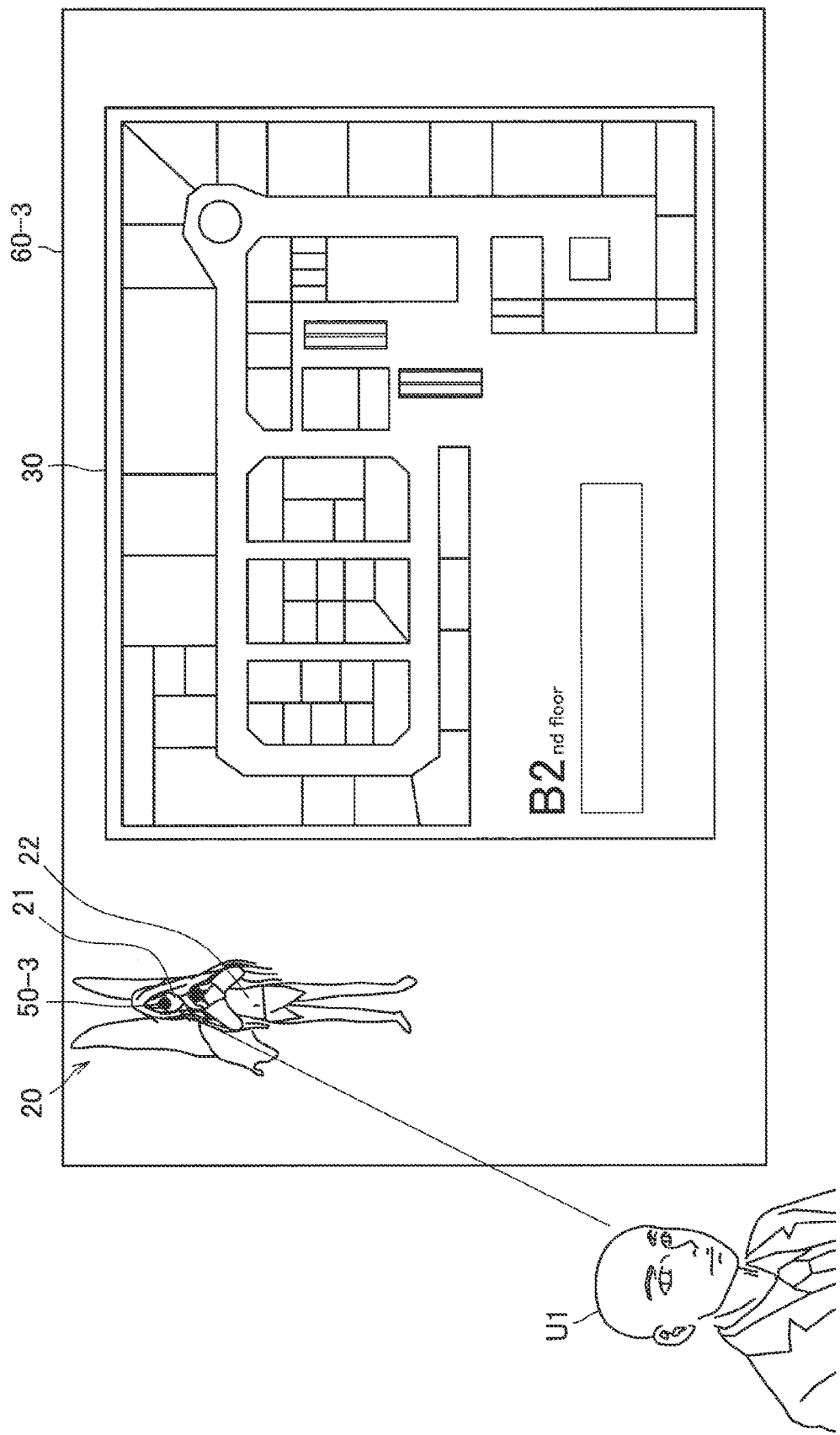
FIG. 6 is a diagram for explaining an example of agent control.

Referring to FIG. 6, the visual field of the user U1 has changed from the visual field 60-2 (FIG. 5) to a visual field 60-3. The determination unit 125 determines whether or not a gaze point 50-3 is located on the face 21 even after the face 21 is turned to the user U1. When the determination unit 125 determines that the gaze point 50-3 is located on the face 21, the object control unit 129 starts the control of communication from the agent 20 to the user U1, on the basis of the determination that the gaze point 50-3 is located on the face 21.

What kind of communication is performed from the agent 20 to the user U1 is not particularly limited. In the following, a case where the agent 20 communicates with the user U1 using sound information is mainly assumed. However, instead of the sound information or in addition to the sound information, the agent 20 may communicate with the user U1 by sensory information other than the sound information (for example, visual information or tactile information).

Furthermore, in the following, a case where communication to the user U1 is performed for a guidance (store guidance) related to a store on the map 30 where the gaze point 50-3 was located before the gaze point 50-3 is located on the face 21 is assumed. However, the communication performed from the agent 20 to the user U1 is not limited to the guidance for the user U1 and may be communication other than the guidance. The agent 20 is preferably located near (for example, next to) the store on the map 30 where the gaze point 50-3 was located. This makes it easier to understand which store is related to the guidance given by the agent 20.

Note that whether or not the gaze point is located on a store on the map 30 may be determined in any way. For example, the determination unit 125 acquires the three-dimensional position of the store on the map 30 in the real space. The three-dimensional position of the map 30 in the real space may be acquired in any way. Here, a case where the three-dimensional position of the map 30 in the real space is acquired from a server (not illustrated) via the communication unit 140 is mainly assumed. However, the three-dimensional position of the map 30 in the real space may be acquired from the storage unit 130.

The determination unit 125 can simply determine whether or not the gaze point of the user is located on a store on the map 30, on the basis of the three-dimensional position of the store on the map 30 in the real space and the gaze point.

Alternatively, the determination unit 125 may acquire the position of the store on the map 30 in the visual field of the user U1 by analyzing the visual field analysis image acquired by the visual field information acquisition unit 122. Then, the determination unit 125 may determine whether or not the gaze point is located on the store on the map 30, on the basis of the position of the store on the map 30 in the visual field of the user U1 and the gaze point.

Figure 7:
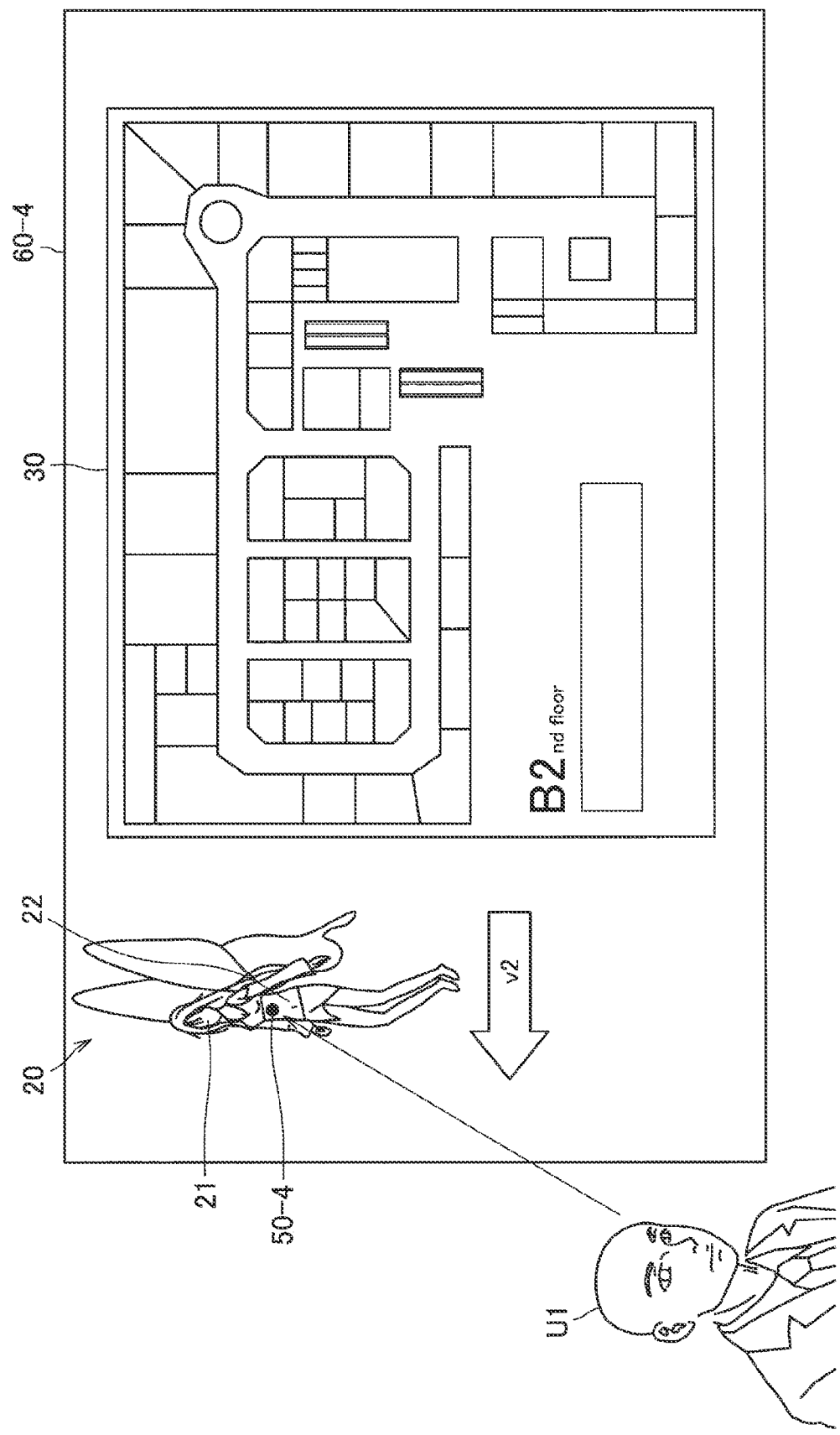
FIG. 7 is a diagram for explaining an example of agent control.

Referring to FIG. 7, the visual field of the user U1 has changed from the visual field 60-3 (FIG. 6) to a visual field 60-4. The determination unit 125 determines whether or not a line-of-sight movement (second line-of-sight movement) has occurred in which a gaze point 50-4 moves toward the body 22 of the agent 20 or has moved to the body 22 of the agent 20. For example, the determination unit 125 can determine that the gaze point 50-4 has moved toward the body 22 when it is predicted that the gaze point 50-4 will reach the body 22, on the basis of a change in the gaze point 50-4 (before the gaze point 50-4 reaches the body 22). Meanwhile, the determination unit 125 can determine that the gaze point 50-4 has moved to the body 22 when the gaze point 50-4 is actually located on the body 22.

In the example illustrated in FIG. 7, the gaze point 50-4 is located on the body 22. Therefore, the determination unit 125 determines that the line-of-sight movement (second line-of-sight movement) has occurred in which the gaze point 50-4 has moved to the body 22. In this manner, when the determination unit 125 determines that the line-of-sight movement (second line-of-sight movement) in which the gaze point 50-4 moves toward the body 22 or has moved to the body 22 has occurred, the object control unit 129 simply moves the agent 20 such that the agent 20 leaves away from the gaze point 50-4, on the basis of such a line-of-sight movement (second line-of-sight movement). It is assumed that this makes it easier for the user U1 to visually recognize an object different from the agent 20, such as an object hidden by the agent 20. At this time, the agent 20 is preferably moved in a direction substantially opposite to the direction of the second line-of-sight movement. For example, when the direction of the second line-of-sight movement is a rightward direction, the agent 20 may be moved in a leftward direction. This movement ensures that the visual recognition of an object other than the agent 20 in which the user U1 is interested is not obstructed.

Note that, in the examples illustrated in FIGS. 6 and 7, when the determination unit 125 starts the communication control on the basis of the gaze point 50-3 (50-4) being located on the face 21 of the agent 20, it is desirable that the agent 20 is arranged on an upper side of the middle of the visual field. If the agent 20 is arranged on a lower side of the middle of the visual field, there is a possibility that, when the user U1 moves the line of sight downward without noticing the agent 20 present on a lower part of the peripheral visual field, the gaze point 50-3 (50-4) hits the face 21 of the agent 20 earlier than the body 22 of the agent 20. In this case, the determination unit 125 starts the control of communication with the agent 20 regardless of the communication intention of the user U1. As a result, the convenience of the user U1 is reduced in some cases. On the other hand, when the agent 20 is arranged on an upper side of the middle of the visual field, the gaze point 50-3 (50-4) hits the body 22 of the agent 20 earlier than the face 21 of the agent 20 even if the user U1 moves the line of sight upward. Accordingly, even when the user U1 moves the line of sight without noticing the agent 20 present in the peripheral visual field, the agent 20 first moves so as to leave away from the gaze point 50-3 (50-4). For this reason, the determination unit 125 can ensure not to obstruct the user U1 from visually recognizing an object other than the agent with respect to the line-of-sight movement of the user U1 in a vertical direction. Such control can be particularly favorably applied to a see-through type HMD having a restriction on the angle of view in the vertical direction.

Moreover, as illustrated in FIG. 7, the object control unit 129 may turn the face 21 toward the user U1 on the basis of the line-of-sight movement (second line-of-sight movement) in which the gaze point 50-4 moves toward the body 22 or has moved to the body 22. This makes it easier for the user U1 to intuitively understand that the gaze point 50-4 moves toward the body 22 or has moved to the body 22.

The object control unit 129 may move the agent 20 in any direction when moving the agent 20 such that the agent 20 leaves away from the gaze point 50-4. For example, the object control unit 129 may move the agent 20 to a peripheral visual field on a left side when the agent 20 is located on the left of the middle of the visual field, as illustrated in FIG. 7. According to such a movement, the agent 20 does not move through the middle of the visual field, and it is thus ensured that the visual recognition of an object other than the agent 20 located in the central visual field is not obstructed.

Note that, here, a case where the determination unit 125 determines that the agent 20 and the map 30 have a predetermined positional relationship, and the line-of-sight movement (second line-of-sight movement) in which the gaze point 50-4 moves toward the body 22 or has moved to the body 22 has occurred is assumed. Then, a case where the object control unit 129 moves the agent 20 at a second moving speed v2, on the basis of these determinations is assumed. These cases will be described later in detail with reference to FIG. 8.

On the other hand, the object control unit 129 may move the agent 20 to a peripheral visual field on a right side when the agent 20 is located on the right of the middle of the visual field. According to such a movement, the agent 20 does not move through the middle of the visual field, and it is thus ensured that the visual recognition of an object other than the agent 20 located in the central visual field is not obstructed.

Alternatively, the object control unit 129 may move the agent 20 in a vector direction according to a vector direction of the line-of-sight movement of the user U1, on the basis of the line-of-sight movement (second line-of-sight movement) in which the gaze point 50-4 moves toward the body 22 or has moved to the body 22. With this movement, the object control unit 129 may move the agent 20 such that the agent 20 leaves away from the gaze point 50-4 of the user U1. The vector direction according to the vector direction of the line-of-sight movement may be a direction approximately same as the vector direction of the line-of-sight movement, or may be any one direction closer to the vector direction of the line-of-sight movement among leftward and rightward directions.

Note that, as in the example illustrated in FIG. 7, when the determination unit 125 determines that the gaze point is out of the face 21, the object control unit 129 can end the control of communication from the agent 20 to the user U1 on the basis of the determination that the gaze point is out of the face 21.

Figure 8:
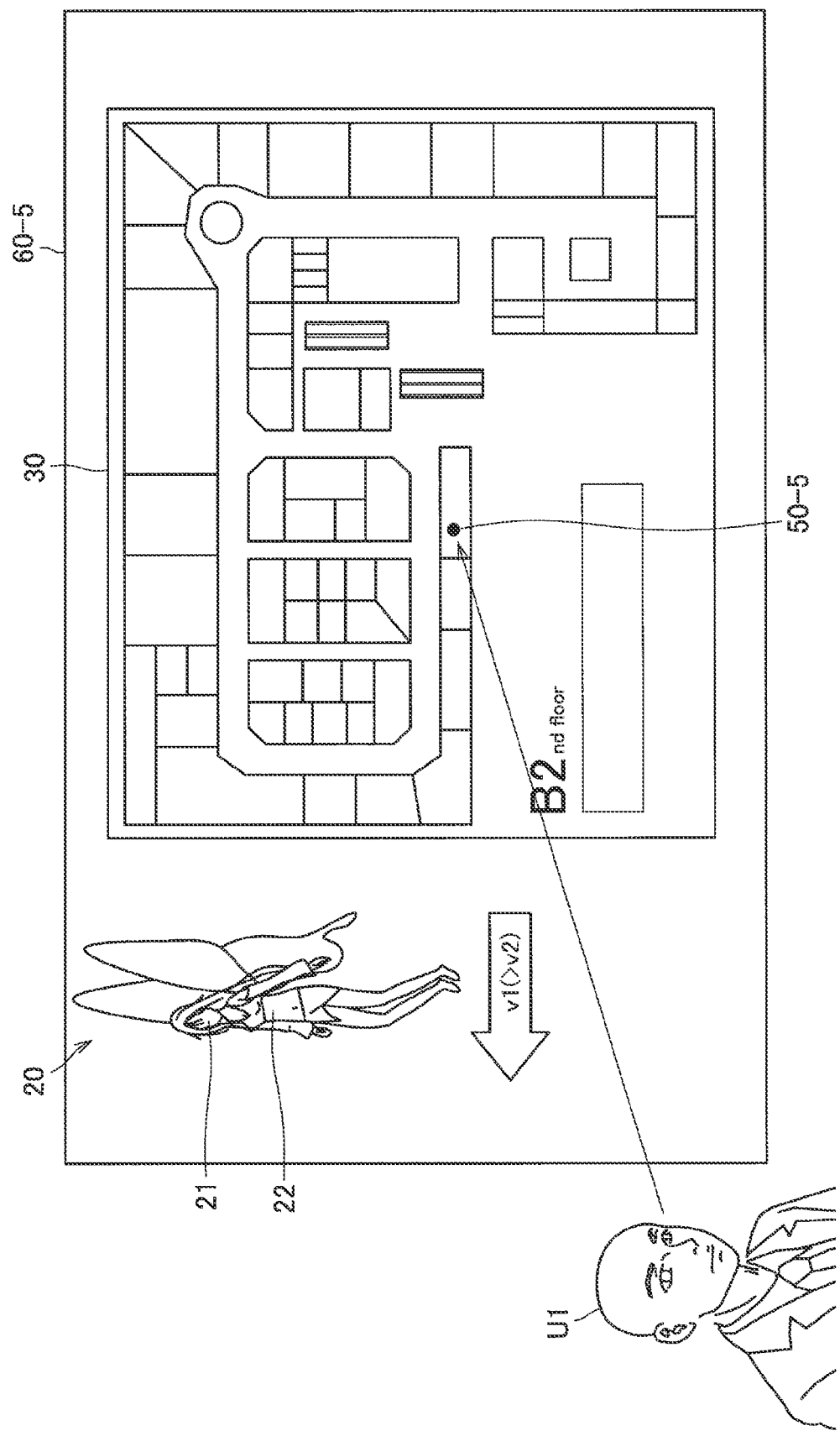
FIG. 8 is a diagram for explaining an example of agent control.

Referring to FIG. 8, the visual field of the user U1 has changed from the visual field 60-4 (FIG. 7) to a visual field 60-5. The determination unit 125 determines whether or not a gaze point 50-5 moves toward the agent 20 or has moved to the agent 20.

In the example illustrated in FIG. 8, the gaze point 50-5 is present at a position different from the position of the agent 20. The determination unit 125 determines that the gaze point 50-5 has not moved toward the agent 20 and the gaze point 50-5 has not moved to the agent 20. In this manner, when the determination unit 125 determines that the gaze point 50-5 has not moved toward the agent 20 or has not moved to the agent 20, the object control unit 129 simply moves the agent 20 to the peripheral visual field. This movement ensures that the visual recognition of an object other than the agent 20 located in the central visual field is not obstructed.

Note that FIG. 8 illustrates an example in which the object control unit 129 moves the agent 20 at a first moving speed v1 on the basis of the determination that the gaze point 50-5 is located on the map 30. Meanwhile, FIG. 7 illustrates an example in which the agent 20 is moved at the second moving speed v2 on the basis of the determination that the agent 20 and the map 30 have a predetermined positional relationship, and the line-of-sight movement (second line-of-sight movement) in which the gaze point 50-4 moves toward the body 22 or has moved to the body 22. Moreover, FIG. 5 illustrates an example in which the position of the agent 20 is unchanged on the basis of the line-of-sight movement (first line-of-sight movement) in which the gaze point 50-2 has moved to the face 21. The desirable second moving speed v2 will be described.

Here, the predetermined relationship is not limited, but can be a relationship in which the agent 20 and the map 30 are present within a predetermined area of the visual field of the user U1 (for example, a relationship in which both of the agent 20 and the map 30 are accommodated within the visual field, or a relationship in which both of the agent 20 and the map 30 are accommodated within a certain area relative to the gaze point as a reference). In such a case, it is difficult to discriminate between a case where the user is trying to gaze at the face 21 and a case where the user is trying to gaze the map 30.

Therefore, in such a case, the object control unit 129 preferably moves the agent 20 at the second moving speed v2, which is between a case where the position of the agent 20 is unchanged and a case where the agent 20 is moved at the first moving speed v1. That is, the object control unit 129 preferably makes the second moving speed v2 slower than the first moving speed v1. This enables the object control unit 129 to employ the second moving speed v2 of the agent 20 as a moving speed that is more convenient for the user U1.

Note that moving the agent 20 at a high speed when the agent 20 is present within the visual field is considered to be uncomfortable for the user U1, but there is no concern when the agent 20 is present out of the visual field. Accordingly, when the agent 20 is present out of the visual field, the object control unit 129 can move the agent 20 faster than a case where the agent 20 is present within the visual field.

Heretofore, the examples of the control of the agent 20 have been described.

(1.3.2. Action of Information Processing Apparatus)

Figure 9:
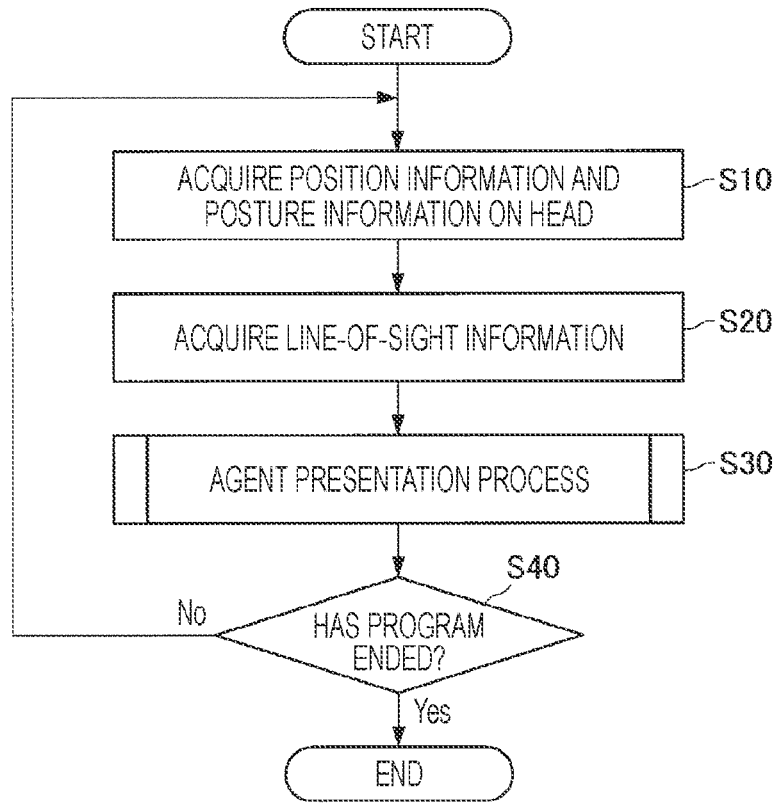
FIG. 9 is a flowchart illustrating an action example of the information processing apparatus.
Figure 10:
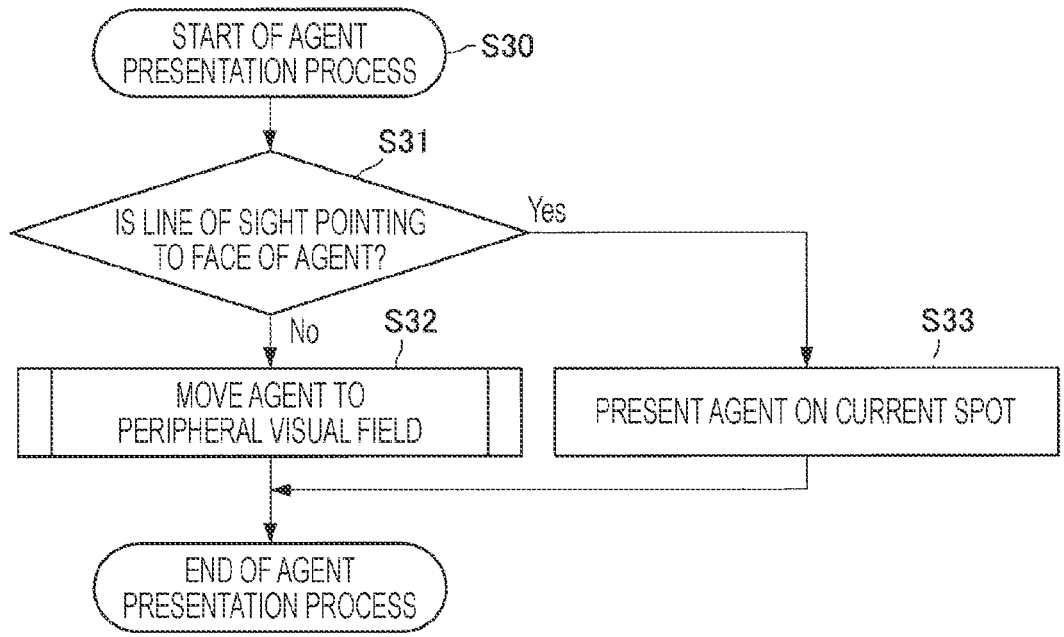
FIG. 10 is a flowchart illustrating an action example of the information processing apparatus.
Figure 11:
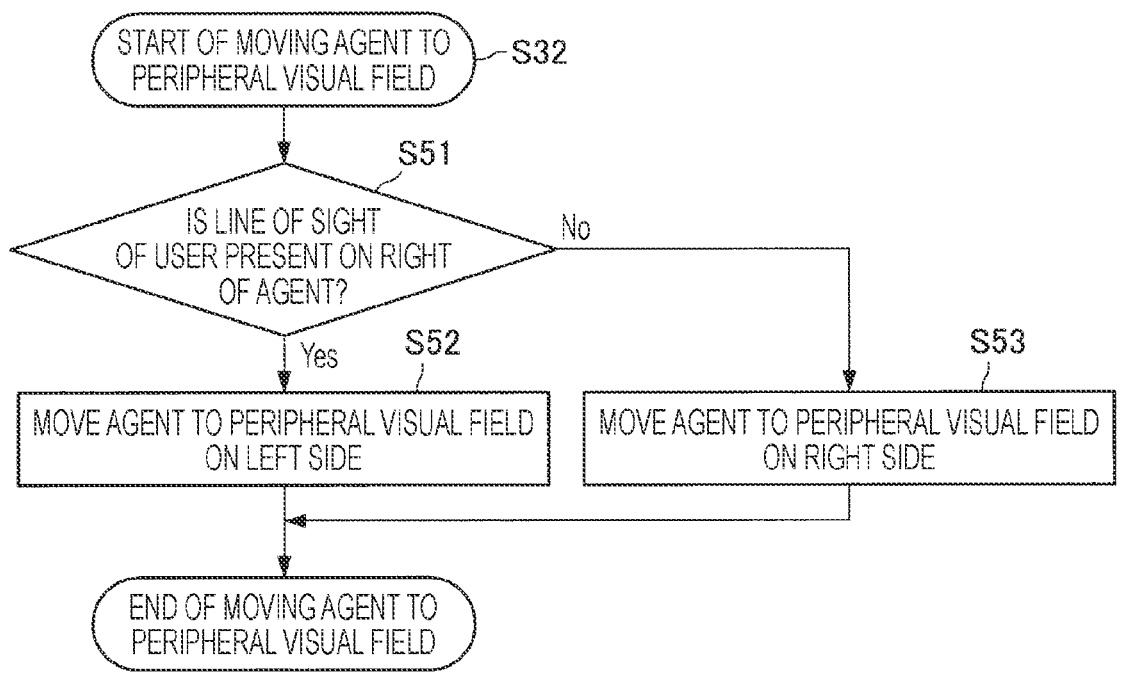
FIG. 11 is a flowchart illustrating an action example of the information processing apparatus.

Examples of the action of the information processing apparatus 10 will be described with reference to FIGS. 9 to 11. FIGS. 9 to 11 are flowcharts illustrating action examples of the information processing apparatus 10. Note that the flowcharts illustrated in FIGS. 9 to 11 merely illustrate examples of the action of the information processing apparatus 10. Therefore, the action of the information processing apparatus 10 is not limited to the examples illustrated in FIGS. 9 to 11.

First, when the position and posture of the head of the user U1 are detected by the sensor unit 113, the visual field information acquisition unit 122 acquires the position information and the posture information on the head of this user U1, as illustrated in FIG. 9 (S10). Meanwhile, the line-of-sight information acquisition unit 121 acquires the line-of-sight information on the user U1 (S20). Subsequently, an agent presentation process is executed (S30). Details of the agent presentation process are illustrated in FIG. 10.

As illustrated in FIG. 10, the determination unit 125 detects the line of sight of the user U1 in the real space on the basis of the position information and the posture information on the head of the user U1 and the line-of-sight information on the user U1, and determines whether or not the line of sight in the real space is pointing to the face 21 of the agent 20 (S31). When it is determined that the line of sight is pointing to the face 21 of the agent 20 ("Yes" in S31), the object control unit 129 presents the agent 20 on the current spot (that is, the position of the agent 20 in the real space is unchanged) (S33).

On the other hand, when it is determined that the line of sight is not pointing to the face 21 of the agent 20 ("No" in S31), the object control unit 129 moves the agent 20 to the peripheral visual field (S32). Details of the process of moving the agent 20 to the peripheral visual field are illustrated in FIG. 11.

As illustrated in FIG. 11, the determination unit 125 determines whether or not the line of sight of the user U1 is present on the right of the agent 20 (S51). When the determination unit 125 determines that the line of sight of the user U1 is present on the right of the agent 20 ("Yes" in S51), the object control unit 129 moves the agent 20 to a peripheral visual field on a left side (S52). On the other hand, when the determination unit 125 determines that the line of sight of the user U1 is present on the left of the agent 20 ("No" in S51), the object control unit 129 moves the agent 20 to a peripheral visual field on a right side (S53).

When the process of moving the agent to the peripheral visual field ends as illustrated in FIG. 11, and the agent presentation process ends as illustrated in FIG. 10, the control unit 120 determines whether or not a program has ended as illustrated in FIG. 9 (S40). When the program has not ended ("No" in S40), the control unit 120 shifts the action to S10. On the other hand, when the program has ended ("Yes" in S40), the control unit 120 ends the action.

Heretofore, the examples of the action of the information processing apparatus 10 have been described.

(1.3.3. Various Modifications)

Figure 12:
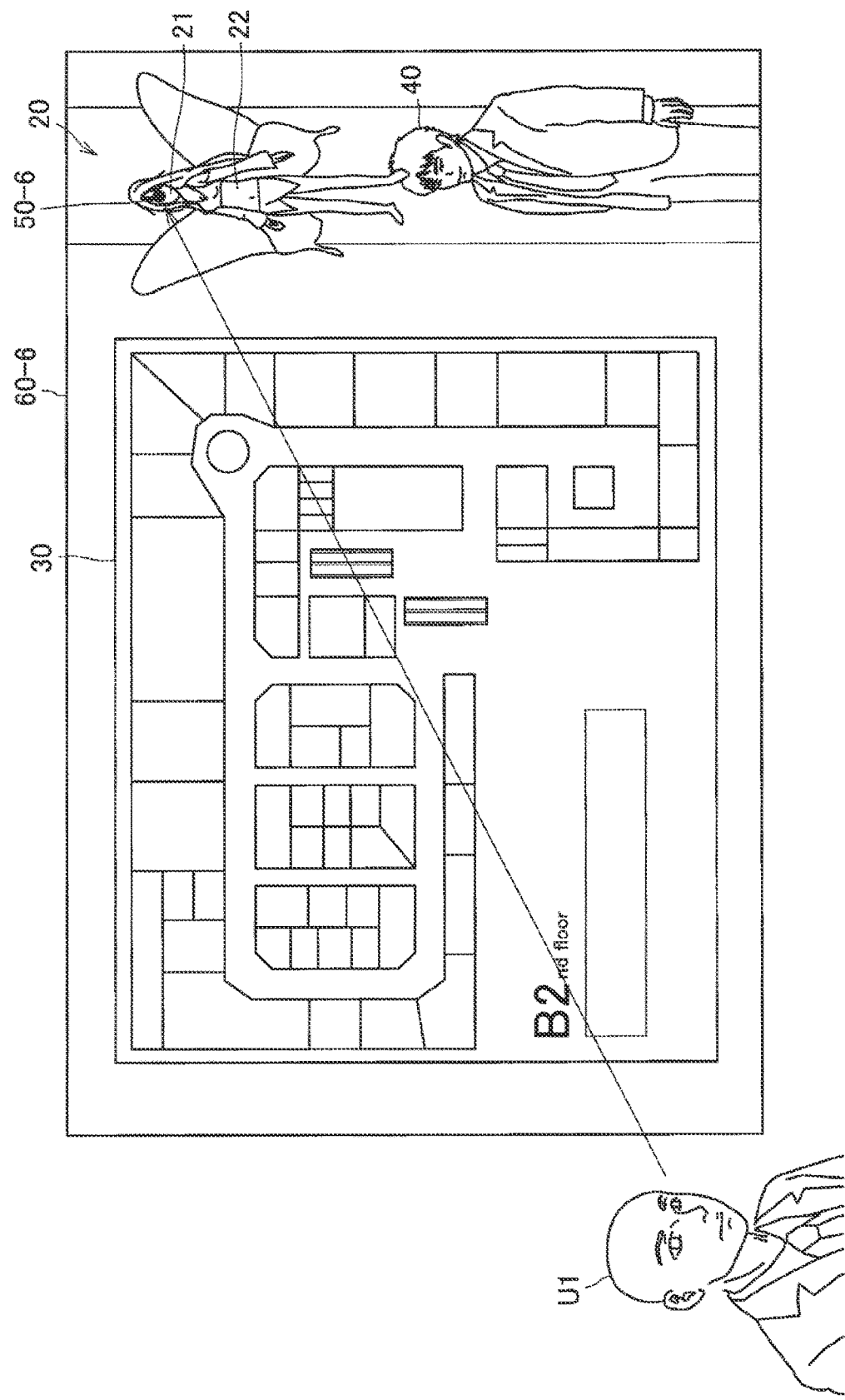
FIG. 12 is a diagram for explaining a first modification of agent control.
Figure 13:
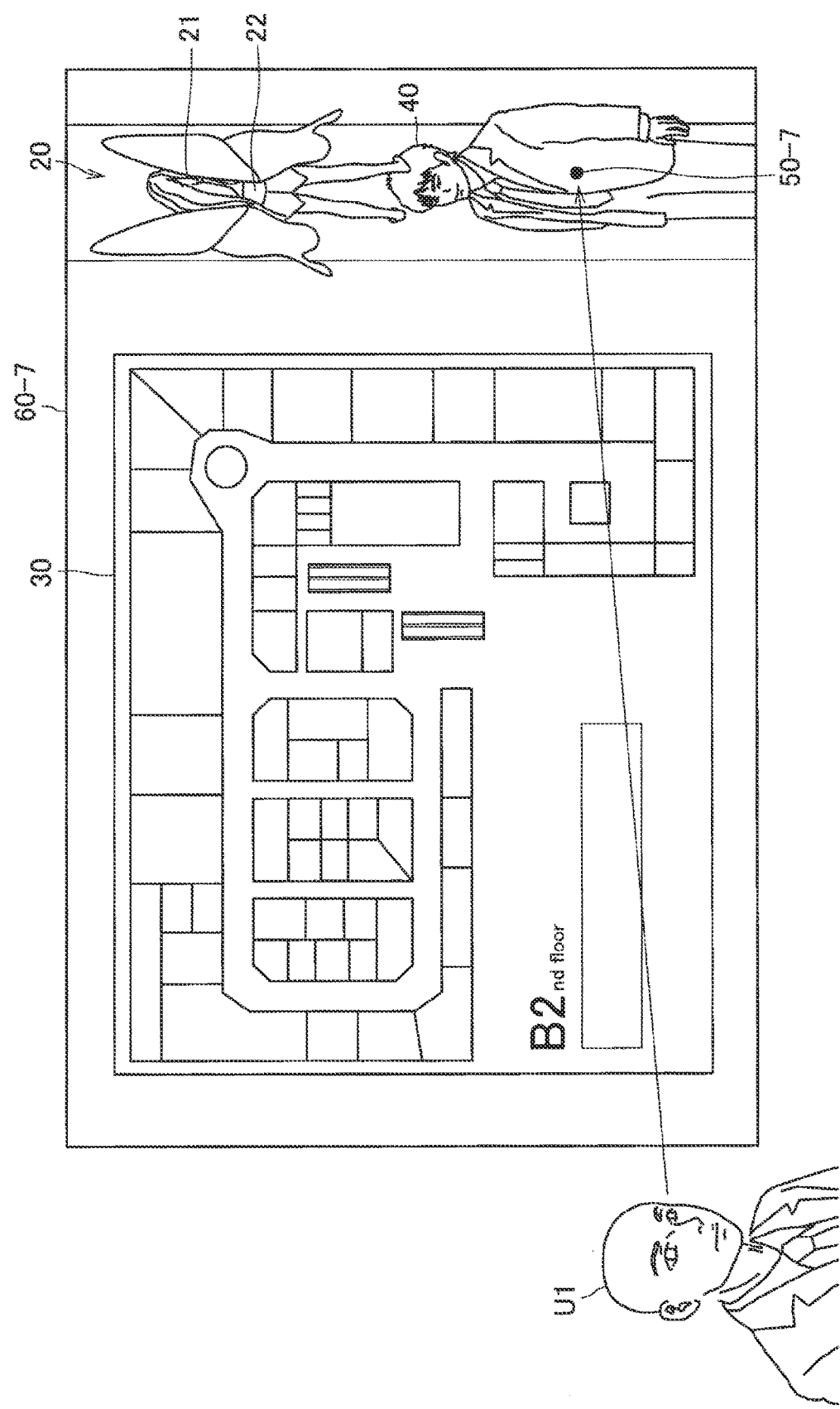
FIG. 13 is a diagram for explaining the first modification of agent control.

The control of the agent 20 according to the embodiments of the present disclosure is executed as described above. However, the control of the agent 20 is not limited to the above examples. In the following, modifications of the control of the agent 20 will be described with reference to FIGS. 12 to 20. FIGS. 12 and 13 are diagrams for explaining a first modification of the control of the agent 20.

Referring to FIG. 12, a visual field 60-6 of the user U1 is illustrated. In the visual field 60-6, the agent 20 who has moved to a right side of the map 30 is present. Furthermore, the person 40 is present on a further side of the agent 20 as viewed from the user U1. Similar to the example illustrated in FIG. 5, the determination unit 125 determines whether or not a line-of-sight movement (first line-of-sight movement) has occurred in which a gaze point 50-6 moves toward the face 21 of the agent 20 or has moved to the face 21 of the agent 20.

In the example illustrated in FIG. 12, the gaze point 50-6 is located on the face 21. Therefore, the determination unit 125 determines that the line-of-sight movement (first line-of-sight movement) has occurred in which the gaze point 50-6 has moved to the face 21. In this manner, when the determination unit 125 determines that the line-of-sight movement (first movement) in which the gaze point 50-6 moves toward the face 21 or has moved to the face 21 has occurred, the object control unit 129 suppresses the movement of the agent 20 on the basis of such a line-of-sight movement (first line-of-sight movement).

At this time, similarly to the example illustrated in FIG. 5, the object control unit 129 can turn the face 21 toward the user U1 on the basis of the line-of-sight movement (first line-of-sight movement) in which the gaze point 50-6 moves toward the face 21 or has moved to the face 21. Then, the object control unit 129 can turn a front surface of the body 22 toward the user U1 after turning the face 21 toward the user U1, on the basis of the line-of-sight movement (first line-of-sight movement) in which the gaze point 50-6 moves toward the face 21 or has moved to the face 21.

Referring to FIG. 13, the visual field of the user U1 has changed from the visual field 60-6 (FIG. 12) to a visual field 60-7. The determination unit 125 determines whether or not a gaze point 50-7 of the user U1 has moved to an object (second object) different from the agent 20. In the example illustrated in FIG. 13, the determination unit 125 determines that the gaze point 50-7 of the user U1 has moved to the person 40, which is different from the agent 20. In such a case, the object control unit 129 turns the face 21 of the agent 20 away from the user U1. This makes it easier for the user U1 to intuitively understand that the gaze point 50-7 has moved to another object.

Note that the object control unit 129 may turn the face 21 of the agent 20 toward the person 40 at which the gaze point 50-7 of the user U1 is present, before turning the face 21 of the agent 20 away from the user U1. According to such control, the user U1 is more easily allowed to intuitively understand which object the gaze point 50-7 has moved to. Furthermore, this control can give the user U1 a feeling that the agent 20 grasps the intention of the user U1.

FIGS. 14 to 18 are diagrams for explaining a second modification of the control of the agent 20. The example illustrated in FIG. 7 has described a case where the object control unit 129 ends the control of communication from the agent 20 to the user U1 on the basis of the determination that the gaze point is out of the face 21. However, even if it is determined that the gaze point is out of the face 21, there can be a case where it is better to continue the communication control. In the second modification, such a case will be described.

For example, when the agent 20 is arranged in association with the third object, the object control unit 129 can continue the communication control while the gaze point of the user U1 is moving between the agent 20 and the third object.

In more detail, the object control unit 129 can continue the communication control while the gaze point is moving between the agent 20 and the third object from one to the other (moving in one way). Alternatively, the object control unit 129 may continue the communication control while reciprocation between the agent 20 and the third object is being performed. In the following, as the third object, a store on the map 30 at the gaze point will be described as an example. However, the third object is not limited to the store on the map 30.

Figure 14:
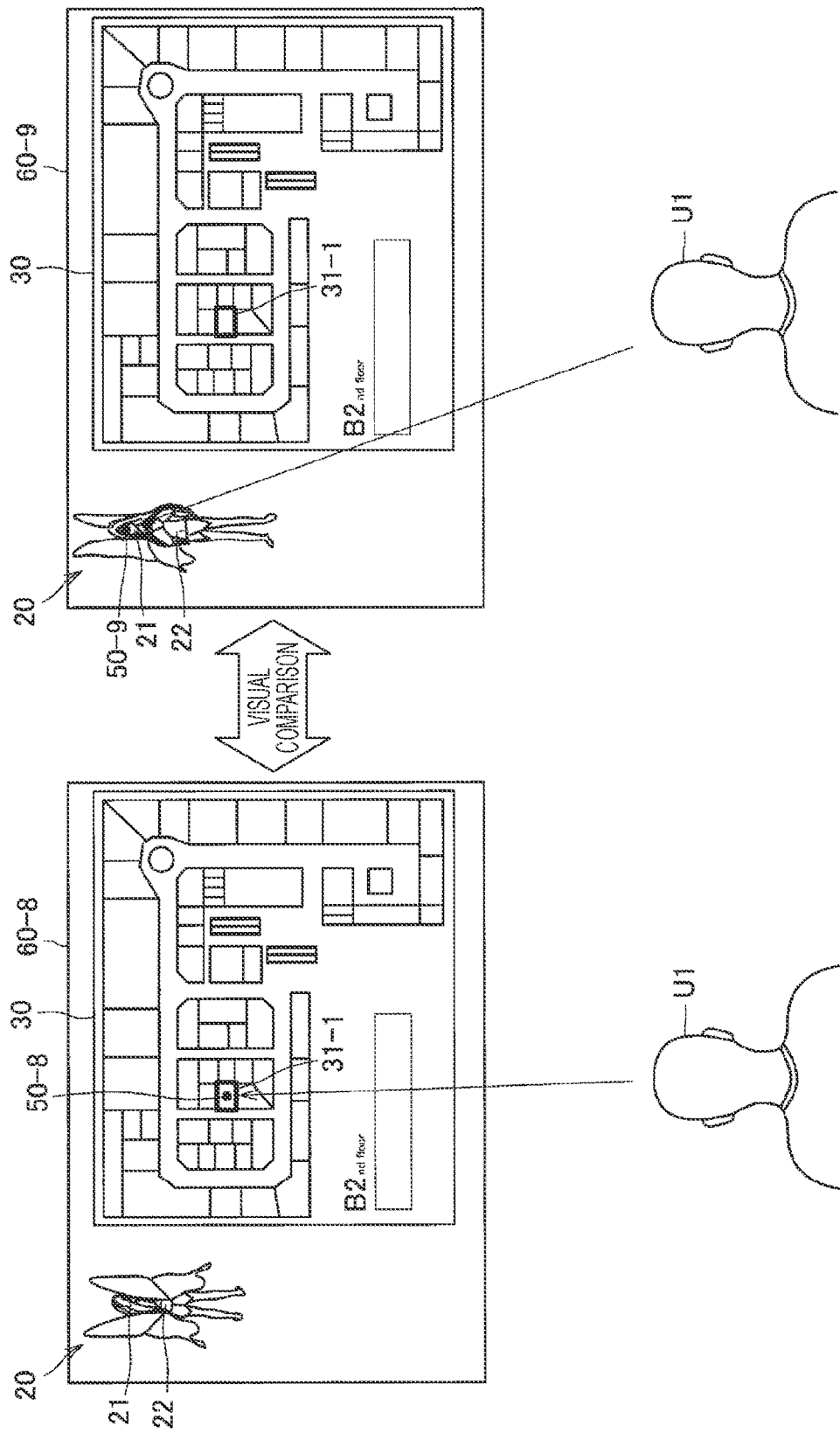
FIG. 14 is a diagram for explaining a second modification of agent control.

Referring to FIG. 14, a visual field 60-8 of the user U1 is illustrated. A store 31-1 on the map 30 is present in the visual field 60-8. The agent 20 is arranged in association with the store 31-1 on the map 30. Then, since the user U1 is interested in the store 31-1, the user U1 turns his/her line of sight to the store 31-1 on the map 30 (that is, a gaze point 50-8 is present on the store 31-1 on the map 30).

Thereafter, the visual field of the user U1 has changed from the visual field 60-8 to a visual field 60-9. Referring to the visual field 60-9, a gaze point 50-9 has moved to the face 21 of the agent 20. At this time, the object control unit 129 assumes a case where communication with the user U1 is performed for a guidance related to the store 31-1 (content of interest) on the map 30 where the gaze point 50-8 was located. The user U1 can listen to the guidance related to the store 31-1.

At this time, it is assumed that the user U1 is interested in the store 31-1 on the map 30 where the gaze point 50-8 was located. Therefore, even if the gaze point 50-8 is out of the face 21 of the agent 20, the object control unit 129 preferably continues the communication control while the gaze point of the user U1 is moving between the agent 20 and the store 31-1 on the map 30 (by deducing that visual comparison between the agent 20 and the store 31-1 on the map 30 is only given by) the user U1.

Figure 15:
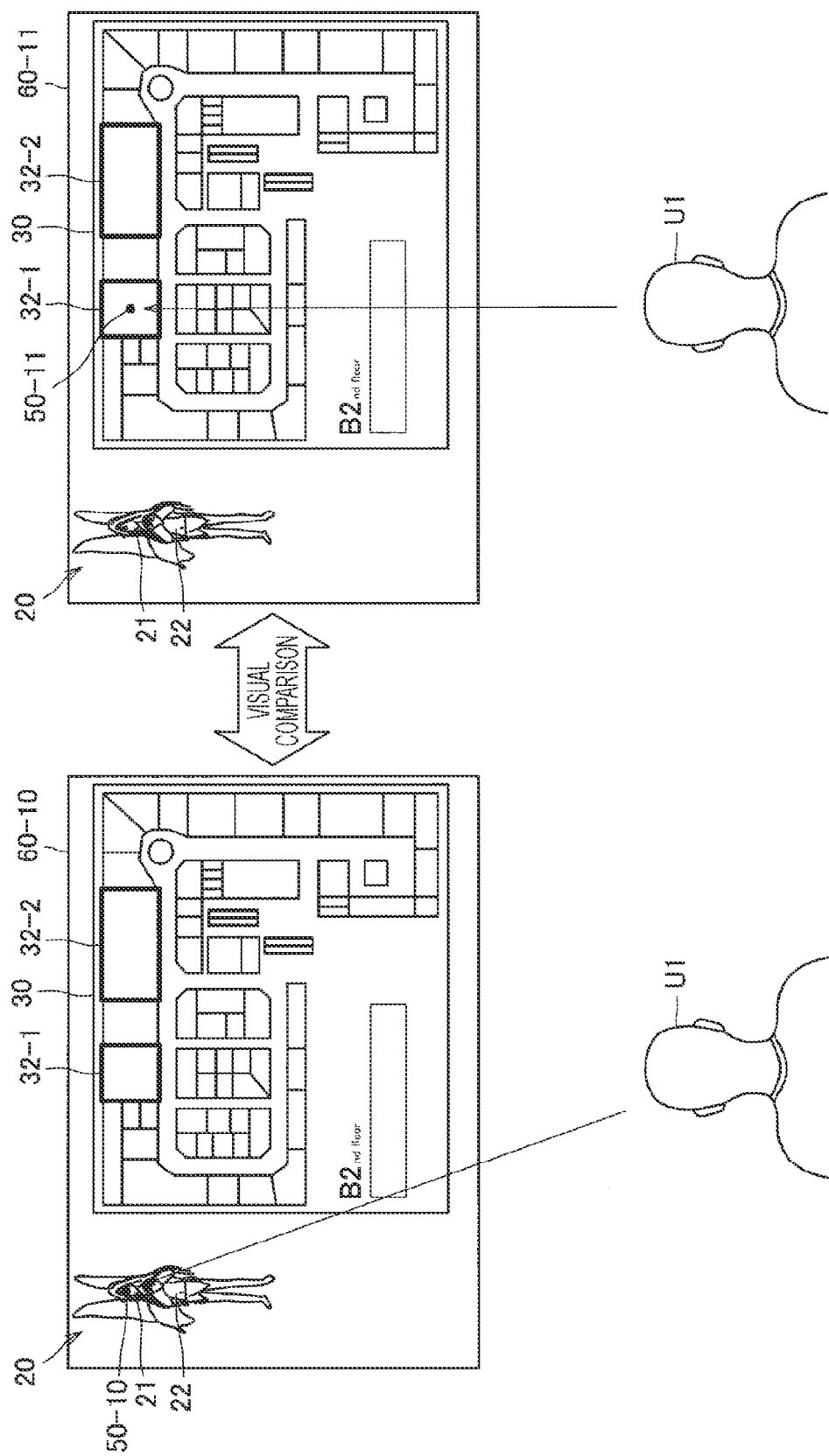
FIG. 15 is a diagram for explaining the second modification of agent control.

Referring to FIG. 15, a visual field 60-10 of the user U1 is illustrated. A store 32-1 and a store 32-2 on the map 30 are present in the visual field 60-10. The agent 20 is arranged in association with the stores 31-1 and 32-2 on the map 30. Then, the user U1 turns his/her line of sight to the face 21 of the agent 20 (that is, a gaze point 50-10 is present on the face 21 of the agent 20). At this time, the object control unit 129 assumes a case where the user U1 is to be visually notified of the stores 32-1 and 32-2 (suggested content) on the map 30 (in the example illustrated in FIG. 15, the visual notification is made by thickening the frame of each of the stores 32-1 and 32-2).

Thereafter, the visual field of the user U1 has changed from the visual field 60-10 to a visual field 60-11. Referring to the visual field 60-11, a gaze point 50-11 has moved to the store 32-1. The object control unit 129 communicates with the user U1 for a guidance related to the store 32-1 on the map 30 where the gaze point 50-11 is located. The user U1 can listen to the guidance related to the store 32-1.

At this time, it is assumed that the user U1 is interested in the store 32-1 on the map 30 where the gaze point 50-11 is located. Therefore, even if the gaze point 50-11 is out of the face 21 of the agent 20, the object control unit 129 preferably continues the communication control while the gaze point of the user U1 is moving between the agent 20 and the store 32-1 on the map 30 (by deducing that visual comparison between the agent 20 and the store 32-1 on the map 30 is only given by) the user U1.

Figure 16:
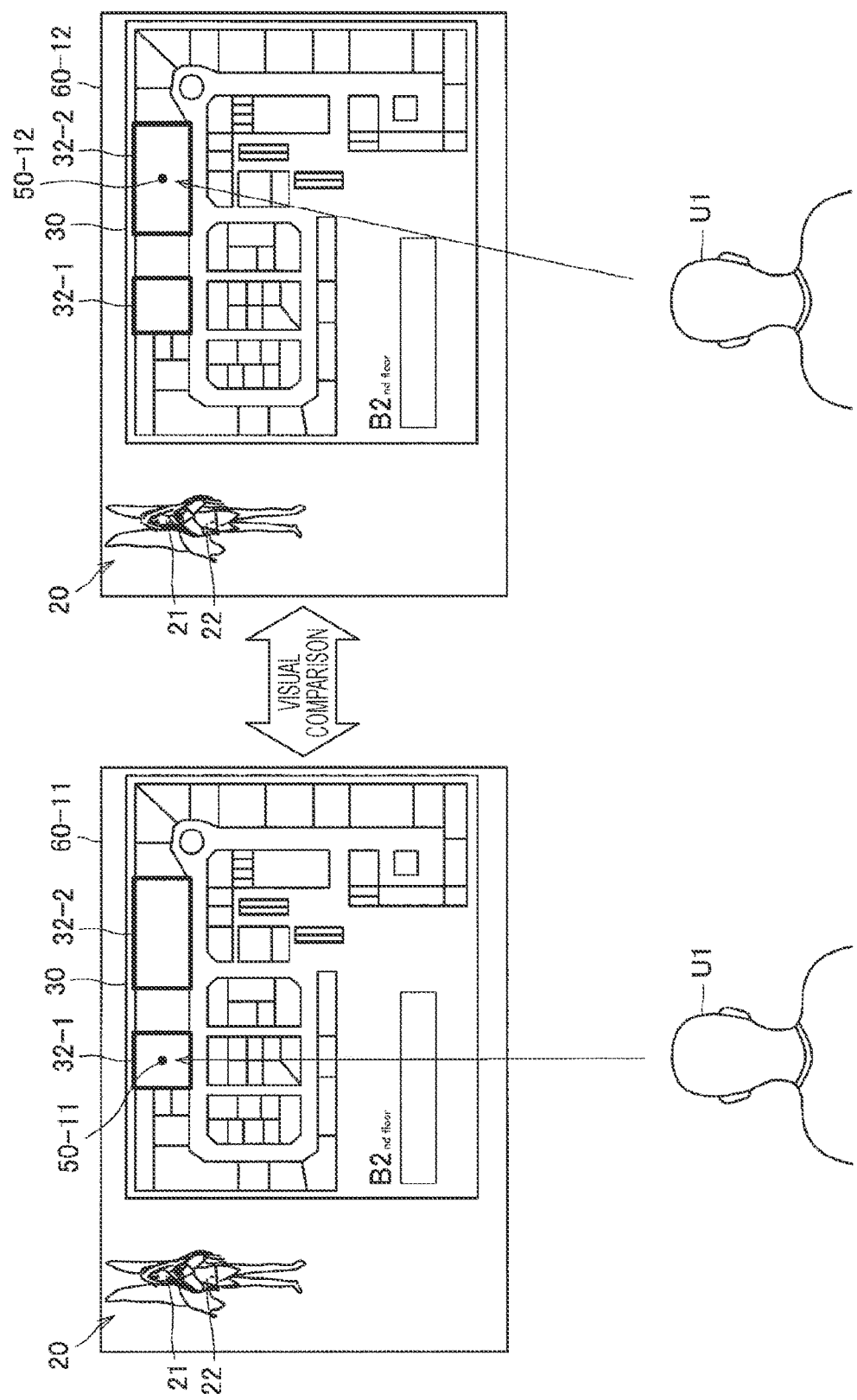
FIG. 16 is a diagram for explaining the second modification of agent control.

Referring to FIG. 16, the visual field 60-11 illustrated in FIG. 15 is illustrated again. The visual field of the user U1 changes from the visual field 60-11 to a visual field 60-12.

Referring to the visual field 60-12, a gaze point 50-12 has moved to the store 32-2. The object control unit 129 communicates with the user U1 for a guidance related to the store 32-2 on the map 30 where the gaze point 50-12 is located. The user U1 can listen to the guidance related to the store 32-2.

At this time, it is assumed that the user U1 is interested in the store 32-2 on the map 30 where the gaze point 50-12 is located. Therefore, the object control unit 129 preferably continues the communication control while the gaze point of the user U1 is moving between the stores 32-1 and 32-2 on the map 30 (by deducing that visual comparison between the stores 32-1 and 32-2 on the map 30 is only given by) the user U1.

Figure 17:
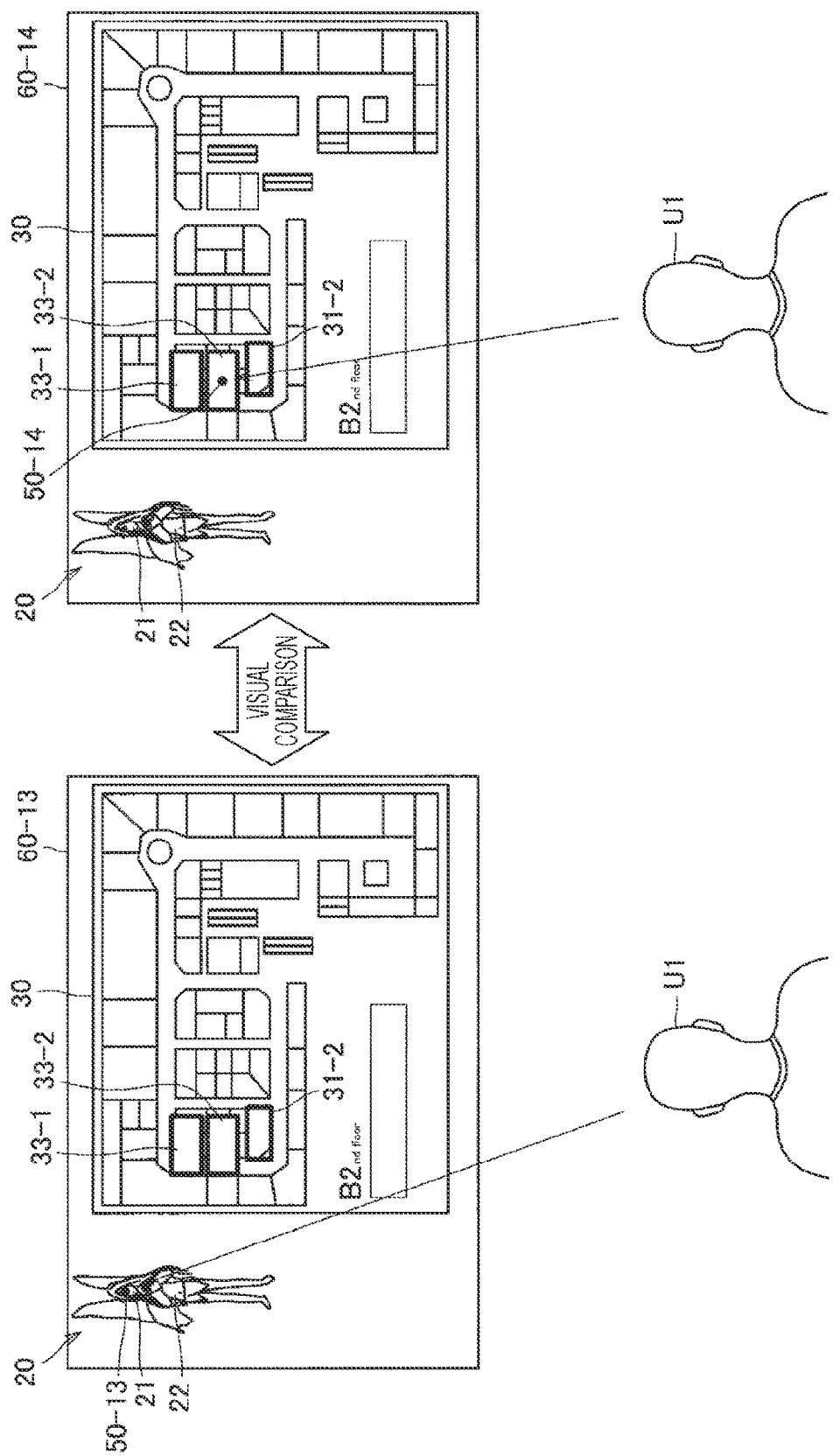
FIG. 17 is a diagram for explaining the second modification of agent control.

Referring to FIG. 17, a visual field 60-13 of the user U1 is illustrated. A store 31-2 on the map 30 is present in the visual field 60-13. The agent 20 is arranged in association with the store 31-2 on the map 30. Then, since the user U1 is interested in the store 31-2, the user U1 turns his/her line of sight to the store 31-2 on the map 30 (that is, a gaze point 50-13 is present on the store 31-2 on the map 30).

Related content 33-1 and related content 33-2 are associated with the store 31-2. The related content 33-1 and the related content 33-2 are not limited, but may be, for example, content relating to a product or service provided by the store 31-2. At this time, the object control unit 129 assumes a case where the user U1 is to be visually notified of the related content 33-1 and the related content 33-2 (in the example illustrated in FIG. 17, the visual notification is made by thickening the frame of each of the related content 33-1 and the related content 33-2).

Thereafter, the visual field of the user U1 has changed from the visual field 60-13 to a visual field 60-14. Referring to the visual field 60-14, a gaze point 50-14 has moved to the related content 33-2. At this time, the object control unit 129 assumes a case where communication with the user U1 is performed for a guidance related to the related content 33-2 where the gaze point 50-14 is located. The user U1 can listen to the guidance related to the related content 33-2.

At this time, it is assumed that the user U1 is interested in the related content 33-2 where the gaze point 50-14 is located. Therefore, even if the gaze point 50-14 is out of the face 21 of the agent 20, the object control unit 129 preferably continues the communication control while the gaze point of the user U1 is moving between the agent 20 and the related content 33-2 (by deducing that visual comparison between the agent 20 and the related content 33-2 is only given by) the user U1.

Figure 18:
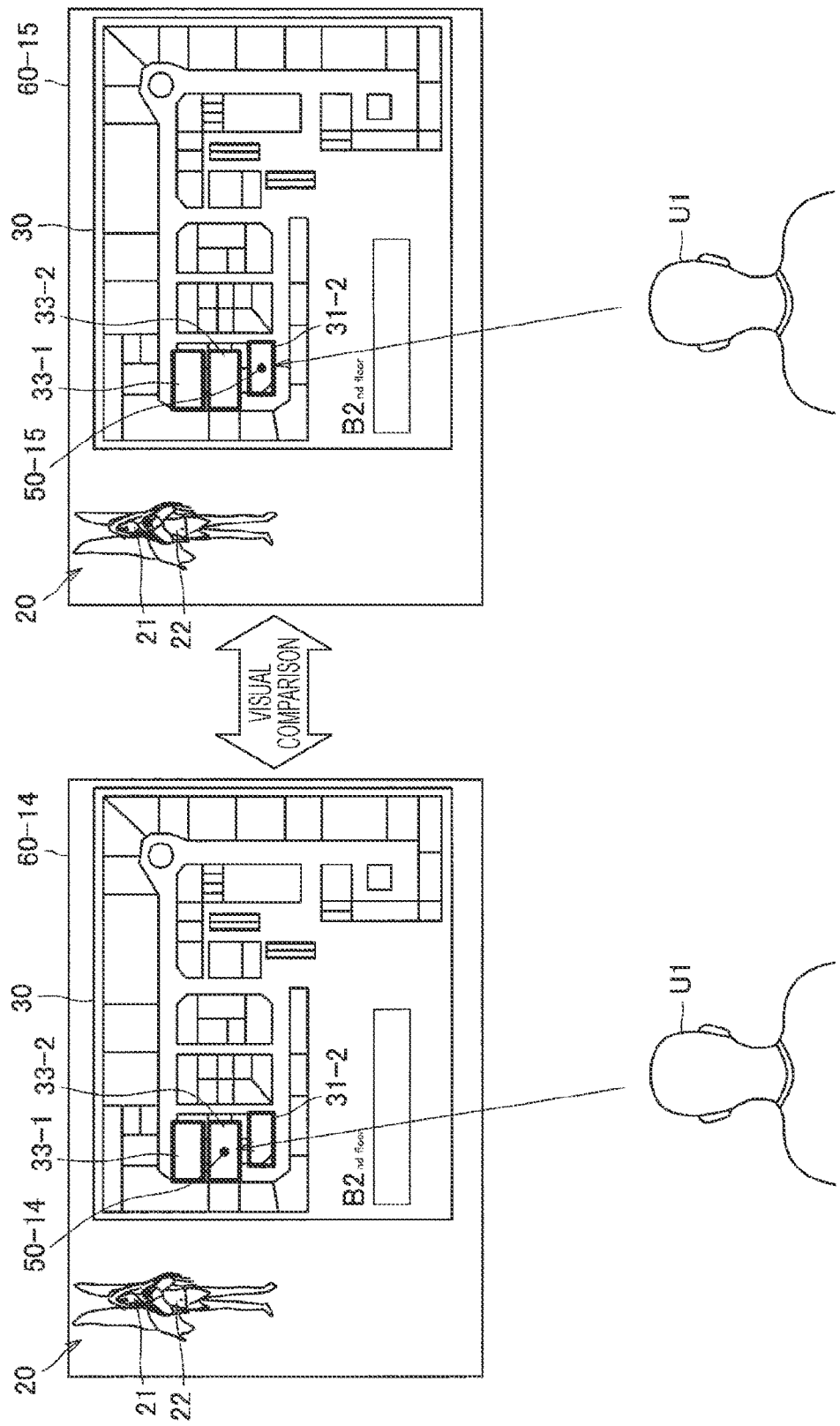
FIG. 18 is a diagram for explaining the second modification of agent control.

Referring to FIG. 18, the visual field 60-14 illustrated in FIG. 17 is illustrated again. The visual field of the user U1 changes from the visual field 60-14 to a visual field 60-15. Referring to the visual field 60-15, the gaze point 50-12 has moved to the store 31-2. The object control unit 129 communicates with the user U1 for a guidance related to the store 31-2 on the map 30 where a gaze point 50-15 is located. The user U1 can listen to the guidance related to the store 31-2.

At this time, it is assumed that the user U1 is interested in the store 31-2 on the map 30 where the gaze point 50-15 is located. Therefore, the object control unit 129 preferably continues the communication control while the gaze point of the user U1 is moving between the related content 33-2 and the store 31-2 on the map 30 (by deducing that visual comparison between the related content 33-2 and the store 31-2 on the map 30 is only given by) the user U1.

Similarly, the object control unit 129 preferably continues the communication control while the gaze point of the user U1 is moving between the related content 33-1 and the related content 33-2 (by deducing that visual comparison between the related content 33-1 and the related content 33-2 is only given by) the user U1.

Figure 19:
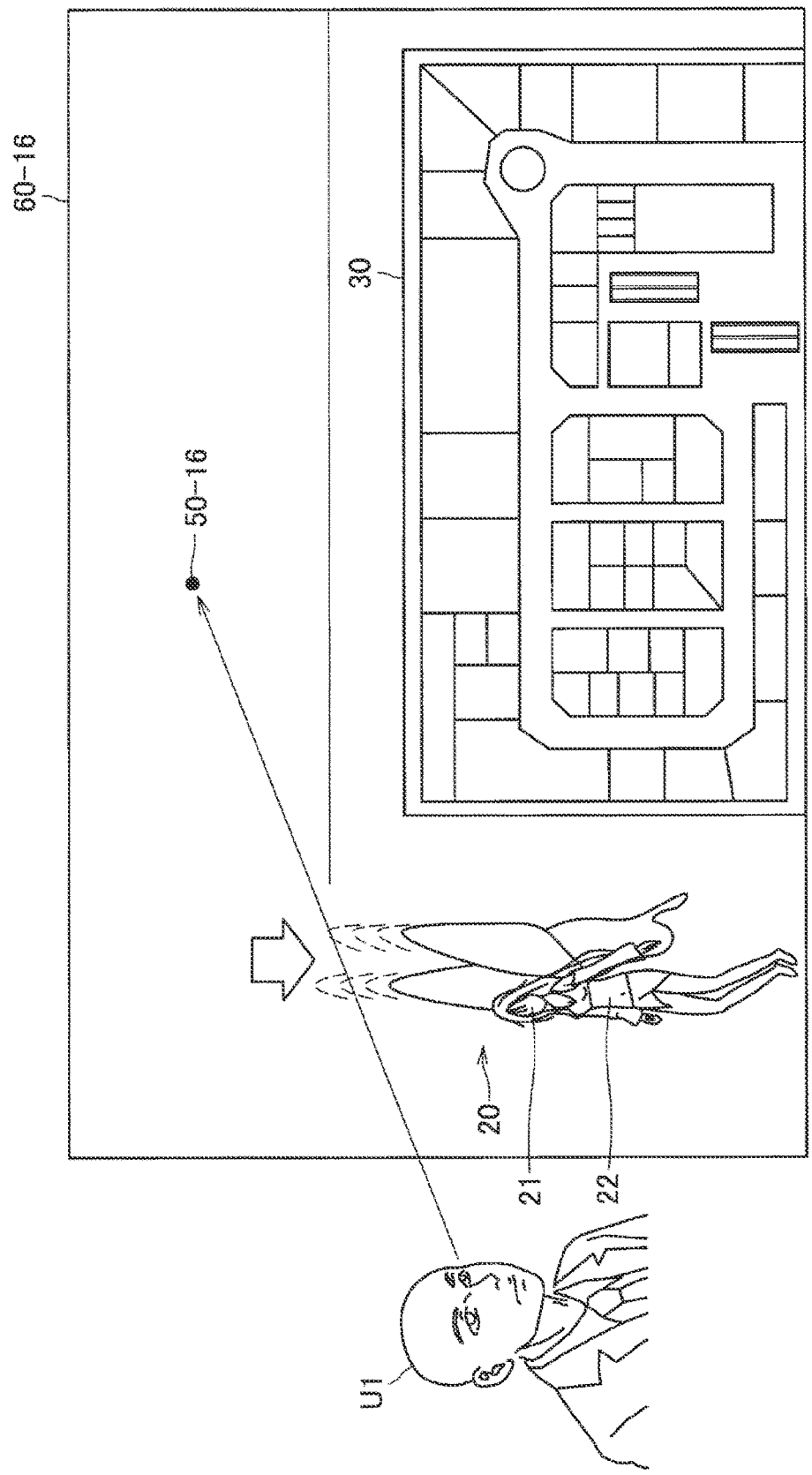
FIG. 19 is a diagram for explaining a third modification of agent control.
Figure 20:
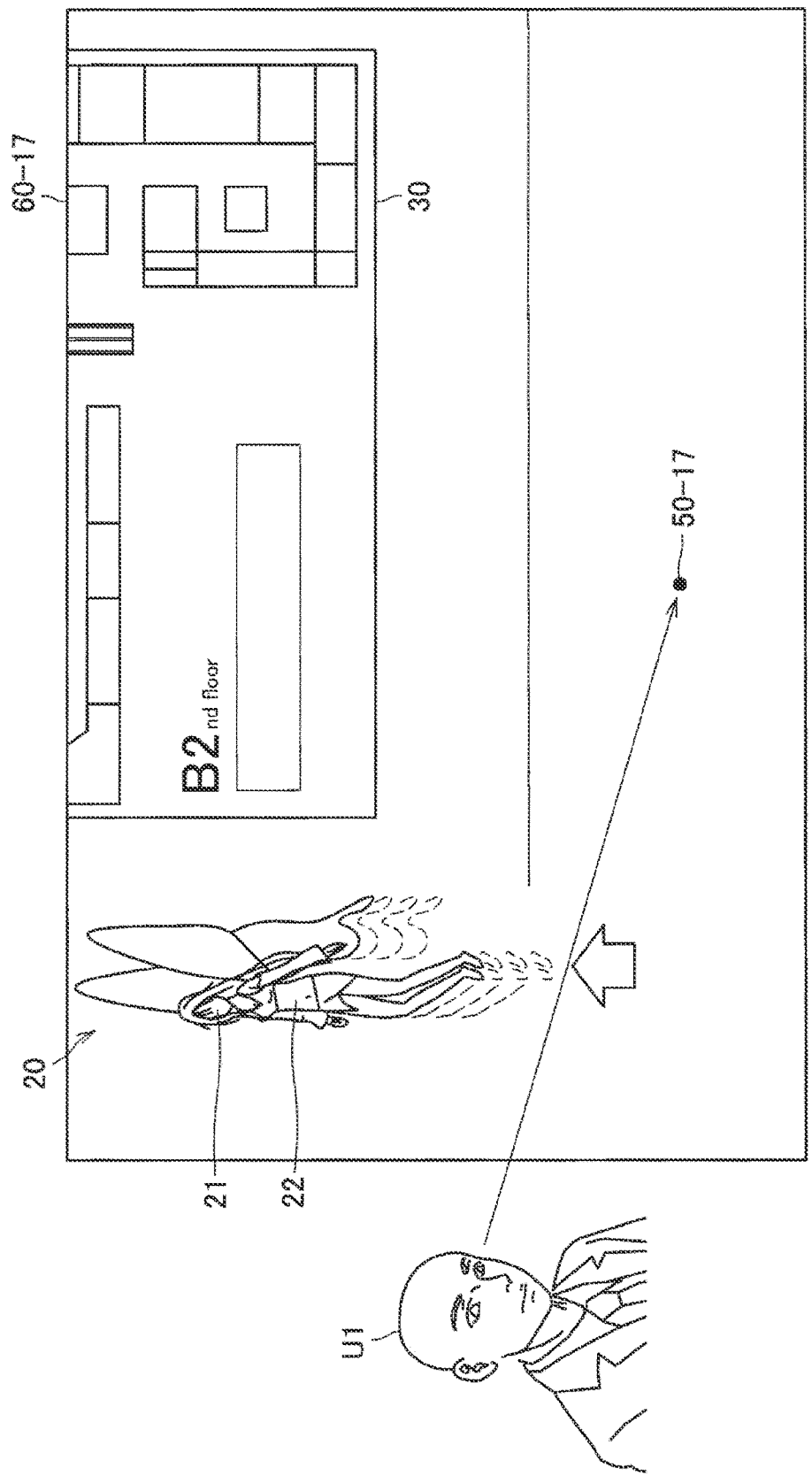
FIG. 20 is a diagram for explaining the third modification of agent control.

FIGS. 19 and 20 are diagrams for explaining a third modification of the control of the agent 20. In the examples illustrated in FIGS. 7 and 8, a case where the object control unit 129 moves the agent 20 in a leftward direction has been described. However, when the vector direction of the visual field change of the user U1 is an upward direction, the line of sight tends to point upward in the visual field. On the other hand, when the vector direction of the visual field change of the user U1 is a downward direction, the line of sight tends to point downward in the visual field. Thus, it becomes easier to visually recognize an object different from the agent 20 by also controlling the vertical position of the agent 20.

Referring to FIG. 19, a visual field 60-16 of the user U1 is illustrated. The map 30 is present in the visual field 60-16. The user U1 has changed the visual field 60-16 in the upward direction. At this time, a gaze point 50-16 of the user U1 is present on an upper part of the visual field 60-16. When the determination unit 125 determines that the vector direction of the visual field change of the user U1 is the upward direction, the object control unit 129 preferably moves the agent 20 in the downward direction in the visual field 60-16.

Referring to FIG. 20, a visual field 60-17 of the user U1 is illustrated. The map 30 is present in the visual field 60-17. The user U1 has changed the visual field 60-17 in the downward direction. At this time, a gaze point 50-17 of the user U1 is present on a lower part of the visual field 60-17. When the determination unit 125 determines that the vector direction of the visual field change of the user U1 is the downward direction, the object control unit 129 preferably moves the agent 20 in the upward direction in the visual field 60-17.

Note that the vector direction of the visual field change can be detected on the basis of a change in the posture of the head as described earlier. Furthermore, among the control for moving the agent 20 in the downward direction in the visual field 60-16 when it is determined that the vector direction of the visual field change of the user U1 is the upward direction, and the control for moving the agent 20 in the upward direction in the visual field 60-17 when it is determined that the vector direction of the visual field change of the user U1 is the downward direction, the object control unit 129 may perform only any one of the controls, or may perform both of the controls.

2. HARDWARE CONFIGURATION EXAMPLE

Figure 21:
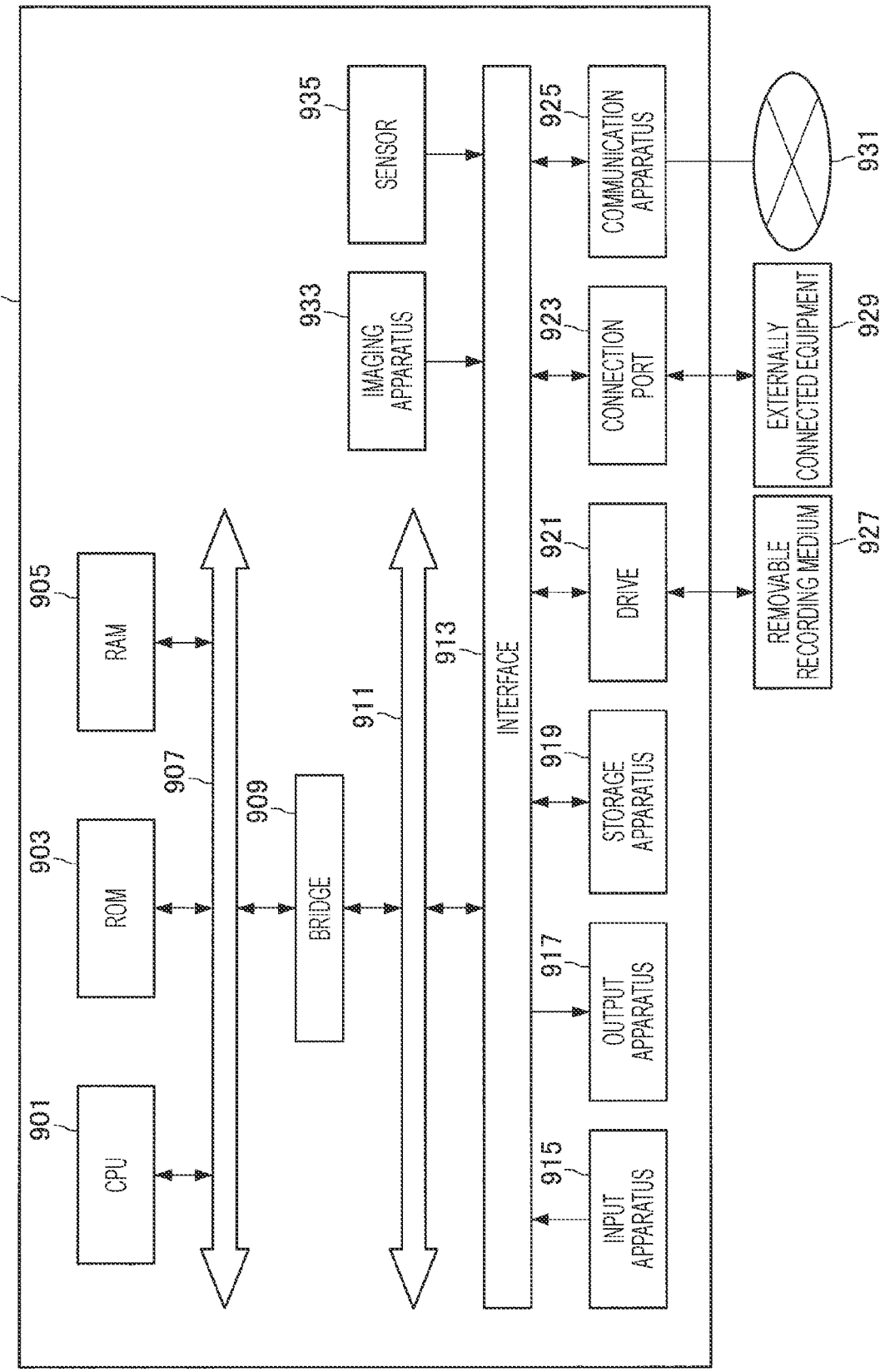
FIG. 21 is a block diagram illustrating a hardware configuration example of the information processing apparatus.

Next, a hardware configuration example of the information processing apparatus 10 according to the embodiments of the present disclosure will be described with reference to FIG. 21. FIG. 21 is a block diagram illustrating a hardware configuration example of the information processing apparatus 10 according to the embodiments of the present disclosure.

As illustrated in FIG. 21, the information processing apparatus 10 includes a central processing unit (CPU) 901, a read only memory (ROM) 903, and a random access memory (RAM) 905. Furthermore, the information processing apparatus 10 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 10 may include an imaging apparatus 933 and a sensor 935 as needed. Instead of or together with the CPU 901, the information processing apparatus 10 may have a processing circuit called a digital signal processor (DSP) or an application specific integrated circuit (ASIC).

The CPU 901 functions as a computational processing unit and a control apparatus, and controls the overall action in the information processing apparatus 10 or a part of the action in accordance with various programs recorded in the ROM 903, the RAM 905, the storage apparatus 919, or a removable recording medium 927. The ROM 903 stores programs, computation parameters, and the like used by the CPU 901. The RAM 905 temporarily stores programs used in the execution of the CPU 901, parameters and the like that appropriately change during the execution. The CPU 901, the ROM 903, and the RAM 905 are mutually connected by the host bus 907 configured from an internal bus such as a CPU bus. Moreover, the host bus 907 is connected to the external bus 911 such as a peripheral component interconnect/interface (PCI) bus via the bridge 909.

The input apparatus 915 is an apparatus operated by a user, such as a mouse, a keyboard, a touch panel, a button, a switch, and a lever. The input apparatus 915 may include a microphone that detects the voice of the user. For example, the input apparatus 915 may be a remote controlling apparatus utilizing infrared rays or other electrical waves, or may be externally connected equipment 929 such as a mobile phone compatible with the operation of the information processing apparatus 10. The input apparatus 915 includes an input control circuit that generates an input signal on the basis of information input by the user and outputs the generated input signal to the CPU 901. The user operates this input apparatus 915 to input various types of data to the information processing apparatus 10 or instruct the information processing apparatus 10 on processing actions. Furthermore, the imaging apparatus 933, which will be described later, can also function as an input apparatus by imaging the motion of the hand of the user, the finger of the user, and the like. At this time, the pointing position may be found out according to the motion of the hand or the orientation of the finger.

The output apparatus 917 is configured from an apparatus capable of visually or audibly notify the user of the acquired information. The output apparatus 917 can be, for example, a display apparatus such as a liquid crystal display (LCD), a plasma display panel (PDP), an organic electro-luminescence (EL) display, or a projector, a hologram display apparatus, a sound output apparatus such as a speaker or headphones, or a printer apparatus. The output apparatus 917 outputs a result obtained by the process by the information processing apparatus 10 as text or a video such as an image or outputs the result as a sound such as voice or acoustics. Furthermore, the output apparatus 917 may include a light or the like for brightening the surroundings.

The storage apparatus 919 is an apparatus for keeping data configured as an example of the storage unit of the information processing apparatus 10. The storage apparatus 919 is configured from, for example, a magnetic storage unit device such as a hard disk drive (HDD), a semiconductor storing device, an optical storing device, or a magneto-optical storing device. This storage apparatus 919 keeps programs and various types of data executed by the CPU 901, various types of data acquired from the outside, and the like.

The drive 921 is a reader/writer for the removable recording medium 927 such as a magnetic disk, an optical disc, a magneto-optical disk, or a semiconductor memory, and is incorporated in or externally attached to the information processing apparatus 10. The drive 921 reads information recorded on the mounted removable recording medium 927 and outputs the read information to the RAM 905. Furthermore, the drive 921 writes a record in the mounted removable recording medium 927.

The connection port 923 is a port for connecting equipment straight to the information processing apparatus 10. The connection port 923 can be, for example, a universal serial bus (USB) port, an Institute of Electrical and Electronic Engineers (IEEE) 1394 port, a small computer system interface (SCSI) port, or the like. Furthermore, the connection port 923 may be a recommended standard (RS)-232C port, an optical audio terminal, a high-definition multimedia interface (HDMI) (registered trademark) port, or the like. By connecting the externally connected equipment 929 to the connection port 923, various types of data can be exchanged between the information processing apparatus 10 and the externally connected equipment 929.

The communication apparatus 925 is, for example, a communication interface configured from a communication device or the like for connecting to the communication network 931. The communication apparatus 925 can be, for example, a communication card for a wired or wireless local area network (LAN), Bluetooth (registered trademark), wireless USB (WUSB), or the like. Furthermore, the communication apparatus 925 may be a router for optical communication, a router for asymmetric digital subscriber line (ADSL), a modem for various communications, or the like. For example, the communication apparatus 925 transmits and receives signals and the like to and from the Internet and other communication equipment, using a predetermined protocol such as transmission control protocol/Internet protocol (TCP/IP). In addition, the communication network 931 connected to the communication apparatus 925 is a network connected in a wired or wireless manner and is, for example, the Internet, a home LAN, infrared communication, radio wave communication, or satellite communication.

The imaging apparatus 933 is an apparatus that images the real space using various members including an imaging element such as a charge coupled device (CCD) or complementary metal oxide semiconductor (CMOS) and a lens or the like for controlling imaging of a subject image on the imaging element, and generates a captured image. The imaging apparatus 933 may capture a still image or may capture a moving image.

The sensor 935 serves as, for example, various sensors such as a distance measuring sensor, an acceleration sensor, a gyro sensor, a geomagnetic sensor, an optical sensor, and a sound sensor. The sensor 935 acquires, for example, information regarding the state of the entire information processing apparatus 10, such as the posture of the casing of the information processing apparatus 10, and information regarding the environment around the information processing apparatus 10, such as the brightness and noise around the information processing apparatus 10. Furthermore, the sensor 935 may include a global positioning system (GPS) sensor that receives a GPS signal and measures the latitude, longitude, and altitude of the apparatus.

3. CONCLUSION

As described above, the embodiments of the present disclosure provide the information processing apparatus 10 including the object control unit 129 that: suppresses a movement of a first object, on the basis of a first line-of-sight movement in which a gaze point of a user moves toward a first part of the first object or has moved to the first part; and moves the first object such that the first object leaves away from the gaze point of the user, on the basis of a second line-of-sight movement in which the gaze point of the user moves toward a second part of the first object different from the first part or has moved to the second part. According to such a configuration, it becomes possible to control an object so as to improve user convenience.

The favorable embodiments of the present disclosure have been described in detail thus far with reference to the accompanying drawings. However, the technological scope of the present disclosure is not limited to these examples. It is obvious that a person with average knowledge on the technological field of the present disclosure can arrive at various alterations or variations within the range of the technological spirit disclosed in the claims and as a matter of course, these alterations or variations are comprehended as part of the technological scope of the present disclosure.

For example, there can be a case where the determination unit 125 determines that the agent 20 overlaps an object on a further side. In such a case, the object control unit 129 may move the agent 20 to the peripheral visual field. According to such a movement, the user U1 is more easily allowed to visually recognize the object on the further side. Alternatively, in such a case, the object control unit 129 may move the agent 20 to the peripheral visual field when a predetermined voice or a predetermined gesture by the user U1 is recognized.

Furthermore, the object control unit 129 may alter the arrangement of the agent 20 according to the context. For example, as described above, when the guidance related to a store is being given, the object control unit 129 preferably arranges the agent 20 near (for example, next to) the store. In addition, the object control unit 129 may arrange the agent 20 next to the user U1 in a scene in which the user U1 makes some selection. This allows the user U1 to experience the feeling of making a selection together with the agent 20. Besides, the object control unit 129 preferably arranges the agent 20 in front of the user U1 when the user U1 is walking. This allows the user U1 to experience the feeling of walking with the agent 20.

For example, it is possible to create a program for causing hardware such as a CPU, a ROM, and a RAM incorporated in a computer to demonstrate a function equivalent to the function included in the control unit 120 described above. Furthermore, a computer-readable recording medium in which the above program is recorded can also be provided.

For example, the position of each component is not particularly limited as long as the action of the information processing apparatus 10 described above is implemented. A part of the process of each unit in the information processing apparatus 10 may be performed by a server apparatus (not illustrated). As a specific example, some or all of respective blocks included in the control unit 120 of the information processing apparatus 10 may be contained in a server apparatus (not illustrated) or the like. For example, some or all of the line-of-sight information acquisition unit 121, the visual field information acquisition unit 122, the determination unit 125, and the object control unit 129 in the information processing apparatus 10 may be contained in a server apparatus (not illustrated) or the like.

Furthermore, the effects described in the present description are merely illustrative or exemplary and are not limiting. In other words, the technology according to the present disclosure can exhibit other effects obvious to those skilled in the art from the description of the present description together with the above-described effects or instead of the above-described effects.

Note that configurations as described below are also within the technological scope of the present disclosure.

(1)

An information processing apparatus including an object control unit that:

suppresses a movement of a first object, on the basis of a first line-of-sight movement in which a gaze point of a user moves toward a first part of the first object or has moved to the first part; and moves the first object such that the first object leaves away from the gaze point of the user, on the basis of a second line-of-sight movement in which the gaze point of the user moves toward a second part of the first object different from the first part or has moved to the second part.

(2)

The information processing apparatus according to (1) above, in which the first part includes a face of the first object.

(3)

The information processing apparatus according to (2) above, in which the object control unit turns the face of the first object toward the user on the basis of the first line-of-sight movement or the second line-of-sight movement.

(4)

The information processing apparatus according to (3) above, in which the second part includes a body of the first object, and the object control unit turns a front surface of the body of the first object toward the user after turning the face of the first object toward the user, on the basis of the first line-of-sight movement.

(5)

The information processing apparatus according to (3) or (4) above, in which the object control unit turns the face of the first object away from the user, when the gaze point of the user moves to a second object different from the first object, after turning the face of the first object toward the user.

(6)

The information processing apparatus according to any one of (2) to (5) above, in which the object control unit starts control of communication from the first object to the user, on the basis of a determination that the gaze point of the user is located on the face of the first object.

(7)

The information processing apparatus according to (6) above, in which when the first object is arranged in association with a third object, the object control unit continues the control of the communication while the gaze point of the user is moving between the first object and the third object.

(8)

The information processing apparatus according to any one of (1) to (7) above, in which the first line-of-sight movement includes that the gaze point of the user is located on the first part, and the second line-of-sight movement includes that the gaze point of the user is located on the second part.

(9)

The information processing apparatus according to any one of (1) to (7) above, in which the object control unit moves the first object such that the first object leaves away from the gaze point of the user, before the gaze point of the user reaches the second part, on the basis of the second line-of-sight movement.

(10)

The information processing apparatus according to any one of (1) to (9) above, in which the object control unit moves the first object such that the first object leaves away from the gaze point of the user, by moving the first object in a vector direction according to a vector direction of a line-of-sight movement of the user, on the basis of the second line-of-sight movement.

(11)

The information processing apparatus according to any one of (1) to (10) above, in which the object control unit:

moves the first object in a downward direction when a vector direction of a visual field change of the user is an upward direction; or moves the first object in an upward direction when the vector direction of the visual field change of the user is a downward direction.

(12)

The information processing apparatus according to any one of (1) to (11) above, in which the object control unit moves the first object to a peripheral visual field of the user when the gaze point of the user has not moved toward the first object.

(13)

The information processing apparatus according to (12) above, in which the first object includes a virtual object displayed in a display area of a display apparatus, and the object control unit moves the virtual object to a boundary of the display area of the display apparatus when the gaze point of the user has not moved toward the virtual object.

(14)

The information processing apparatus according to (12) above, in which the first object includes a real object capable of moving autonomously.

(15)

The information processing apparatus according to any one of (1) to (14) above, in which the object control unit:

moves the first object at a first moving speed on the basis of a determination that the gaze point of the user is located on a fourth object different from the first object; and moves the first object at a second moving speed slower than the first moving speed, on the basis of a determination that the first object and the fourth object have a predetermined positional relationship, and the second line-of-sight movement.

(16)

The information processing apparatus according to (15) above, in which the predetermined positional relationship includes a relationship in which the first object and the fourth object are present within a predetermined area of a visual field of the user.

(17)

The information processing apparatus according to any one of (1) to (16) above, in which the first object includes an object localized in a real space on the basis of information in the real space.

(18)

The information processing apparatus according to any one of (1) to (17) above, in which the information processing apparatus includes a head mounted display (HMD).

(19)

An information processing method including:

suppressing, by a processor, a movement of a first object, on the basis of a first line-of-sight movement in which a gaze point of a user moves toward a first part of the first object or has moved to the first part; and moving, by the processor, the first object such that the first object leaves away from the gaze point of the user, on the basis of a second line-of-sight movement in which the gaze point of the user moves toward a second part of the first object different from the first part or has moved to the second part.

(20)

A program for causing a computer to function as an information processing apparatus including an object control unit that:

suppresses a movement of a first object, on the basis of a first line-of-sight movement in which a gaze point of a user moves toward a first part of the first object or has moved to the first part; and moves the first object such that the first object leaves away from the gaze point of the user, on the basis of a second line-of-sight movement in which the gaze point of the user moves toward a second part of the first object different from the first part or has moved to the second part.

REFERENCE SIGNS LIST

10 Information processing apparatus
20 Agent
21 Face
22 Body
31, 32 Store
33 Related content
40 Person
50 Gaze point
60 Visual field
111 Visual field analysis imaging unit
112 Line-of-sight detection imaging unit
113 Sensor unit
120 Control unit
121 Line-of-sight information acquisition unit
122 Visual field information acquisition unit
125 Determination unit
129 Object control unit
130 Storage unit
140 Communication unit
152 Display unit
U1 User

The invention claimed is:

1. An information processing apparatus, comprising:
an object control unit configured to:
suppress a movement of a first object, wherein
the suppression is based on a first line-of-sight movement in which one of a gaze point of a user moves toward a first part of the first object or the gaze point of the user has moved to the first part, and
the first part includes a face of the first object;
move the first object such that the first object leaves away from the gaze point of the user, wherein
the movement of the first object is based on a second line-of-sight movement in which one of the gaze point of the user moves toward a second part of the first object or the gaze point of the user has moved to the second part,
the second part is different from the first part, and
the second part includes a body of the first object;
turn the face of the first object toward the user based on one of the first line-of-sight movement or the second line-of-sight movement; and
turn a front surface of the body of the first object toward the user after the face of the first object is turned toward the user, wherein the turn of the front surface of the first object is based on the first line-of-sight movement.

2. The information processing apparatus according to claim 1, wherein the object control unit is further configured to turn the face of the first object away from the user, in a case where the gaze point of the user moves to a second object different from the first object, after the face of the first object is turned toward the user.

3. The information processing apparatus according to claim 1, wherein the object control unit is further configured to start control of communication from the first object to the user, based on a determination that the gaze point of the user is located on the face of the first object.

4. The information processing apparatus according to claim 3, wherein in a case where the first object is arranged in association with a third object, the object control unit is further configured to continue the control of the communication while the gaze point of the user moves between the first object and the third object.

5. The information processing apparatus according to claim 1, wherein
the first line-of-sight movement indicates that the gaze point of the user is located on the first part, and the second line-of-sight movement indicates that the gaze point of the user is located on the second part.

6. The information processing apparatus according to claim 1, wherein the object control unit is further configured to move, based on the second line-of-sight movement, the first object such that the first object leaves away from the gaze point of the user, before the gaze point of the user reaches the second part.

7. The information processing apparatus according to claim 1, wherein
the object control unit is further configured to move, based on the second line-of-sight movement, the first object such that the first object leaves away from the gaze point of the user, and
the movement of the first object is in a vector direction according to a vector direction of a third line-of-sight movement of the user.

8. The information processing apparatus according to claim 1, wherein the object control unit is further configured to:
move the first object in a downward direction in a case where a vector direction of a visual field change of the user is an upward direction; or
move the first object in the upward direction in a case where the vector direction of the visual field change of the user is the downward direction.

9. The information processing apparatus according to claim 1, wherein the object control unit is further configured to move the first object to a peripheral visual field of the user in a case where the gaze point of the user has not moved toward the first object.

10. The information processing apparatus according to claim 9, wherein
the first object includes a virtual object displayed in a display area of a display apparatus, and
the object control unit is further configured to move the virtual object to a boundary of the display area of the display apparatus in a case where the gaze point of the user has not moved toward the virtual object.

11. The information processing apparatus according to claim 9, wherein the first object includes a real object capable of autonomous movement.

12. The information processing apparatus according to claim 1, wherein the object control unit is further configured to:
move the first object at a first moving speed based on a determination that the gaze point of the user is located on a fourth object different from the first object; and
move the first object at a second moving speed based on the second line-of-sight movement and a determination that the first object and the fourth object have a determined positional relationship, wherein the second moving speed is slower than the first moving speed.

13. The information processing apparatus according to claim 12, wherein the determined positional relationship includes a relationship in which the first object and the fourth object are present within a determined area of a visual field of the user.

14. The information processing apparatus according to claim 1, wherein the first object includes an object localized in a real space based on information in the real space.

15. The information processing apparatus according to claim 1, wherein the information processing apparatus includes a head mounted display (HMD).

16. An information processing method, comprising:
suppressing, by a processor, a movement of an object, wherein
the suppression is based on a first line-of-sight movement in which one of a gaze point of a user moves toward a first part of the object or the gaze point of the user has moved to the first part, and
the first part includes a face of the object;
moving, by the processor, the object such that the object leaves away from the gaze point of the user, wherein
the movement of the object is based on a second line-of-sight movement in which one of the gaze point of the user moves toward a second part of the object or the gaze point of the user has moved to the second part,
the second part is different from the first part, and
the second part includes a body of the object;
turning, by the processor, the face of the object toward the user based on one of the first line-of-sight movement or the second line-of-sight movement; and
turning, by the processor, a front surface of the body of the object toward the user after the face of the object is turned toward the user, wherein the turn of the front surface of the object is based on the first line-of-sight movement.

17. A non-transitory computer-readable medium having stored thereon computer-executable instructions which, when executed by a computer, cause the computer to execute operations, the operations comprising:
suppressing a movement of an object, wherein
the suppression is based on a first line-of-sight movement in which one of a gaze point of a user moves toward a first part of the object or the gaze point of the user has moved to the first part, and
the first part includes a face of the object;
moving the object such that the object leaves away from the gaze point of the user, wherein
the movement of the object is based on a second line-of-sight movement in which one of the gaze point of the user moves toward a second part of the object or the gaze point of the user has moved to the second part,
the second part is different from the first part, and
the second part includes a body of the object;
turning the face of the object toward the user based on one of the first line-of-sight movement or the second line-of-sight movement; and
turning a front surface of the body of the object toward the user after the face of the object is turned toward the user, wherein the turn of the front surface of the object is based on the first line-of-sight movement.

18. An information processing apparatus, comprising:
an object control unit configured to:
suppress a movement of a first object, wherein
the suppression is based on a first line-of-sight movement in which one of a gaze point of a user moves toward a first part of the first object or the gaze point of the user has moved to the first part, and
the first part includes a face of the first object;
move the first object such that the first object leaves away from the gaze point of the user, wherein
the movement of the first object is based on a second line-of-sight movement in which one of the gaze point of the user moves toward a second part of the first object or the gaze point of the user has moved to the second part, the second part is different from the first part;
turn the face of the first object toward the user based on one of the first line-of-sight movement or the second line-of-sight movement; and
turn the face of the first object away from the user, in a case where the gaze point of the user moves to a second object different from the first object, after the face of the first object is turned toward the user.

* * * * *